United States Patent
Seo et al.

(10) Patent No.: US 10,011,302 B1
(45) Date of Patent: Jul. 3, 2018

(54) FRAME APPARATUS FOR AGRICULTURAL VEHICLES

(71) Applicant: LS Mtron Ltd., Anyang-si, Gyeonggi-do (KR)

(72) Inventors: Yong Min Seo, Anyang-si (KR); Young Gil Park, Anyang-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/830,215

(22) Filed: Dec. 4, 2017

(30) Foreign Application Priority Data

| Dec. 27, 2016 | (KR) | .................. | 10-2016-0179651 |
| Dec. 27, 2016 | (KR) | .................. | 10-2016-0179655 |
| Oct. 16, 2017 | (KR) | .................. | 10-2017-0133736 |
| Oct. 16, 2017 | (KR) | .................. | 10-2017-0133740 |

(51) Int. Cl.
| B62D 21/02 | (2006.01) |
| B62D 21/18 | (2006.01) |
| B62D 21/09 | (2006.01) |
| B62D 27/06 | (2006.01) |
| B60K 5/12 | (2006.01) |
| B62D 21/12 | (2006.01) |
| E02F 3/28 | (2006.01) |
| E02F 3/34 | (2006.01) |

(52) U.S. Cl.
CPC .............. B62D 21/186 (2013.01); B60K 5/12 (2013.01); B62D 21/02 (2013.01); B62D 21/09 (2013.01); B62D 21/12 (2013.01); B62D 27/06 (2013.01); E02F 3/283 (2013.01); E02F 3/34 (2013.01)

(58) Field of Classification Search
CPC ...... B60K 5/12; B60K 5/1216; B62D 21/186; B62D 21/00; B62C 21/02
See application file for complete search history.

(56) References Cited

U.S. PATENT DOCUMENTS

| 2,614,345 | A | * | 10/1952 | Lay ........................ | A01B 31/00 |
| | | | | | 172/308 |
| 4,554,978 | A | * | 11/1985 | Schneider ............... | E02F 3/627 |
| | | | | | 172/247 |
| 4,968,213 | A | * | 11/1990 | Langenfeld ............... | E02F 3/34 |
| | | | | | 172/275 |

(Continued)

FOREIGN PATENT DOCUMENTS

| JP | 2003166260 A | 6/2003 |
| JP | 2006077473 A | 3/2006 |

(Continued)

OTHER PUBLICATIONS

International Search Report for related International Application No. PCT/KR2017/013398; report dated Feb. 27, 2018; (3 pages).

*Primary Examiner* — John D Walters
*Assistant Examiner* — James J Triggs
(74) *Attorney, Agent, or Firm* — K&L Gates LLP

(57) ABSTRACT

A frame apparatus for agricultural vehicles includes an engine frame configured to support an engine of an agricultural vehicle; and at least one of a front frame and a rear frame connected to each of a working machine and the engine frame to support the working machine is mounted in the agricultural vehicle, wherein at least one of the front frame and the rear frame is detachably connected to the engine frame.

15 Claims, 16 Drawing Sheets

(56) References Cited

U.S. PATENT DOCUMENTS 6,056,502 A * 5/2000 Takemura ............. B62D 21/09
   172/275
8,788,156 B2 * 7/2014 Nishimura ............ B60W 10/06
   414/699

FOREIGN PATENT DOCUMENTS

| JP | 2009-022290 | 5/2009 |
|----|---|---|
| KR | 0175157 B1 | 2/1999 |
| KR | 101102516 B1 | 1/2012 |
| KR | 101482546 B1 | 1/2015 |
| KR | 20160038574 A | 4/2016 |

* cited by examiner

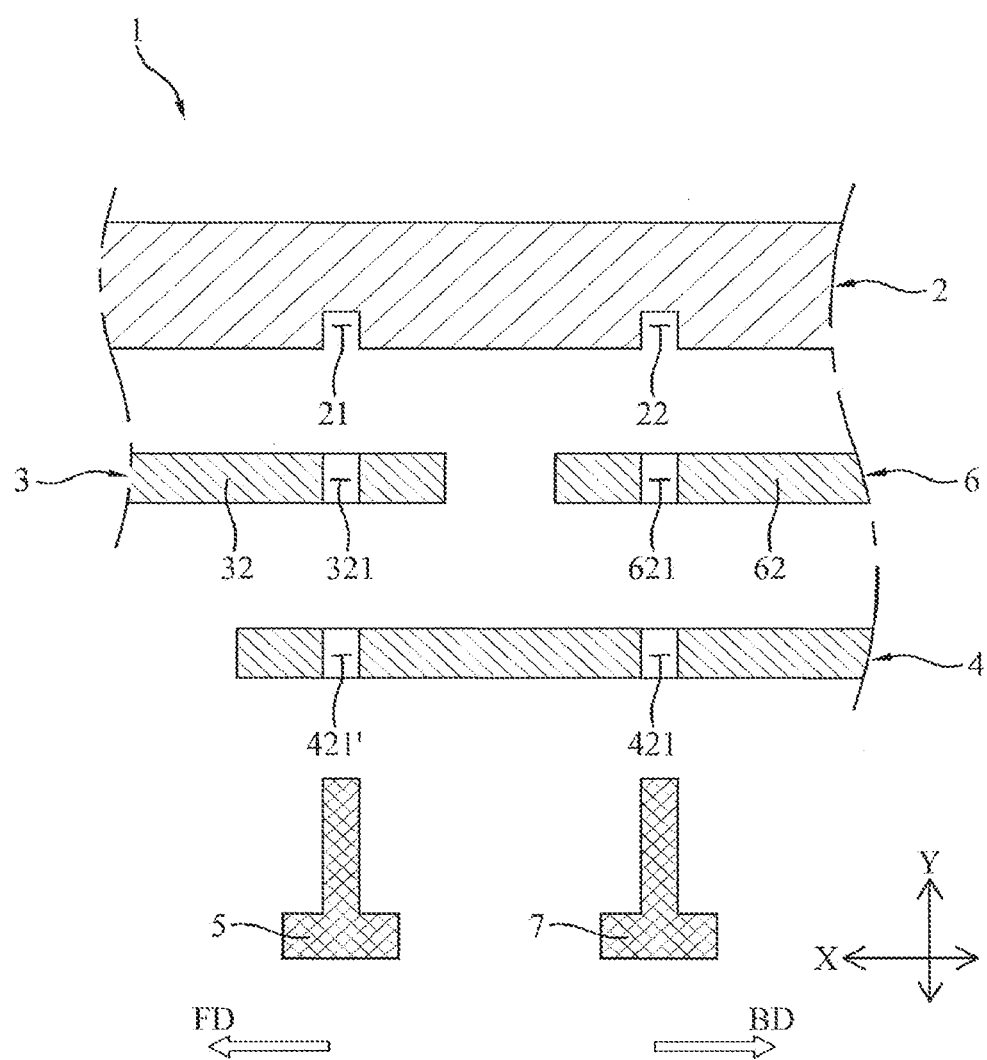

FRAME APPARATUS FOR AGRICULTURAL VEHICLES

CROSS-REFERENCE TO RELATED APPLICATIONS

This application claims priority to Korean Patent Application Nos. 10-2016-0179651, filed Dec. 27, 2016, 10-2016-0179655, filed Dec. 27, 2016, 10-2017-0133736, filed Oct. 16, 2017 and 10-2017-0133740, filed Oct. 16, 2017, the disclosure of which is incorporated herein by reference for all purposes.

BACKGROUND OF THE INVENTION

1. Field of the Invention

The present invention relates to an agricultural vehicle used to cultivate crops required for human life using soil.

2. Description of Related Art

Agricultural vehicles are used to cultivate crops required for human life using soil. For example, combines, tractors, and the like belong to the agricultural vehicles. A combine serves to reap and thresh crops such as rice, barley, wheat, beans, and the like. A tractor uses a traction force to perform processes required for cultivating the crops.

Such agricultural vehicles are implemented to perform a wider range of processes by mounting working machines. For example, working machines such as a loader working machine, a backhoe working machine, and the like may be mounted on the agricultural vehicle. The loader working machine is used to remove or deliver soil, and may be mounted so that the loader working machine is arranged in front of the agricultural vehicle. The backhoe working machine is used to perform an excavation process, and may be mounted so that the backhoe working machine is arranged behind the agricultural vehicle.

Here, an agricultural vehicle according to the prior art is configured to have a structure in which a loader working machine is mounted on an engine frame so that the loader working machine is arranged in front of the engine frame, and a backhoe working machine is also mounted on the engine frame so that the backhoe working machine is arranged behind the engine frame. That is, the agricultural vehicle according to the prior art is configured to have a structure in which both the loader working machine and the backhoe working machine are mounted on the engine frame. Therefore, the agricultural vehicle according to the prior art has the following problems.

First, the agricultural vehicle according to the prior art has a structure in which a significant magnitude of a load is inevitably exerted on the engine frame because both the loader working machine and the backhoe working machine are mounted on the engine frame. Therefore, the agricultural vehicle according to the prior art has a drawback in that the engine frame may be deformed or the engine frame may be damaged and broken.

Second, there is an alternative measure for enhancing the strength of the engine frame so that the engine frame can have a supporting force to support both the loader working machine and the backhoe working machine. However, according to the alternative measure, because the weight of the engine frame increases with an increase in strength of the engine frame, the agricultural vehicle according to the prior art is managed in a state in which the agricultural vehicle is provided with the engine frame with excessive weight even when only one of the working machines such as the loader working machine and the backhoe working machine is mounted on the engine frame. Therefore, the agricultural vehicle according to the prior art has a problem in that an unnecessary increase in the total weight of the agricultural vehicle may be caused due to the engine frame, resulting in reduced fuel economy, and the like.

SUMMARY OF THE INVENTION

Therefore, the present invention is designed to solve the problems and is for providing a frame apparatus for agricultural vehicles capable of reducing deformation in an engine frame due to a load exerted by working machines.

The present invention is for providing a frame apparatus for agricultural vehicles capable of reducing a degree of increase in weight exerted on the engine frame in order to achieve a supporting force for the working machines.

To solve the above problems, the present invention may include the following configurations.

A frame apparatus for agricultural vehicles according to the present invention may include an engine frame configured to support an engine of an agricultural vehicle; a front frame connected to each of a front working machine and the engine frame to support the front working machine mounted at the front of the agricultural vehicle; and a rear frame connected to each of a rear working machine and the engine frame to support the rear working machine mounted at the rear of the agricultural vehicle. The front frame may include a front connection member connected to the engine frame. The rear frame may include a rear connection member connected to the engine frame. The front connection member and the rear connection member may be disposed to overlap each other so that the front connection member and the rear connection member are detachably connected to the engine frame.

A frame apparatus for agricultural vehicles according to the present invention may include an engine frame configured to support an engine of an agricultural vehicle; and a front frame detachably connected to each of a loader working machine and the engine frame to support the loader working machine. The front frame may include a front connection hole through which a rear frame configured to support a backhoe working machine is connected.

A frame apparatus for agricultural vehicles according to the present invention may include an engine frame configured to support an engine of an agricultural vehicle; a protection frame connected to each of a protection unit configured to protect a driver's seat in the agricultural vehicle and the engine frame to support the protection unit; and a rear frame connected to each of a rear working machine and the engine frame to support the rear working machine mounted at the rear of the agricultural vehicle. The protection frame may include a protective connection member connected to the engine frame. Each of the plurality of rear frames may include a rear connection member connected to the engine frame. The protective connection member and the rear connection member may be disposed to overlap each other so that the protective connection member and the rear connection member are detachably connected to the engine frame.

Advantageous Effects

According to the present invention, the frame apparatus for agricultural vehicles may have the following effects.

Because the present invention is implemented to share a load exerted by working machines in order to support the working machines, deformation in the engine frame can be reduced, and the engine frame can be prevented from being damaged and broken. Therefore, the frame apparatus for agricultural vehicles can contribute to enhancing the durability of an agricultural vehicle.

Because the present invention is implemented to reduce a degree of increase in weight exerted on the engine frame in order to achieve a supporting force for the working machines, the frame apparatus for agricultural vehicles can contribute to improving the fuel economy of the agricultural vehicle, and can also contribute to maintaining the overall balance of the agricultural vehicle.

BRIEF DESCRIPTION OF THE DRAWINGS

FIG. 16 is a schematic partial plan view for explaining a connection relationship between the rear frame, the protection frame, a front frame and the engine frame in the frame apparatus for agricultural vehicles according to the second embodiment of the present invention.

DETAILED DESCRIPTION OF THE INVENTION

A frame apparatus for agricultural vehicles according to the present invention may mainly include a first embodiment of the frame apparatus and a second embodiment of the frame apparatus. Hereinafter, the first and second embodiments of the frame apparatus for agricultural vehicles according to the present invention will be sequentially described with reference to the accompanying drawings.

First Embodiment

Figure 1:
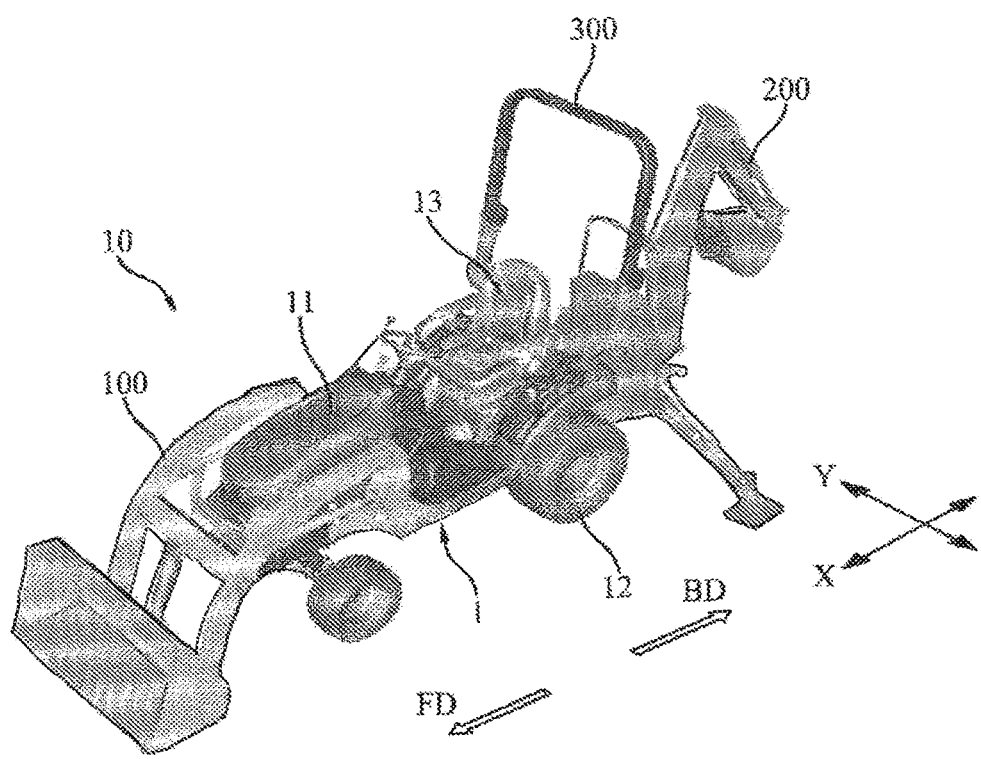
FIG. 1 is a schematic perspective view showing one example of an agricultural vehicle in which a frame apparatus for agricultural vehicles according to the present invention is installed.
Figure 2:
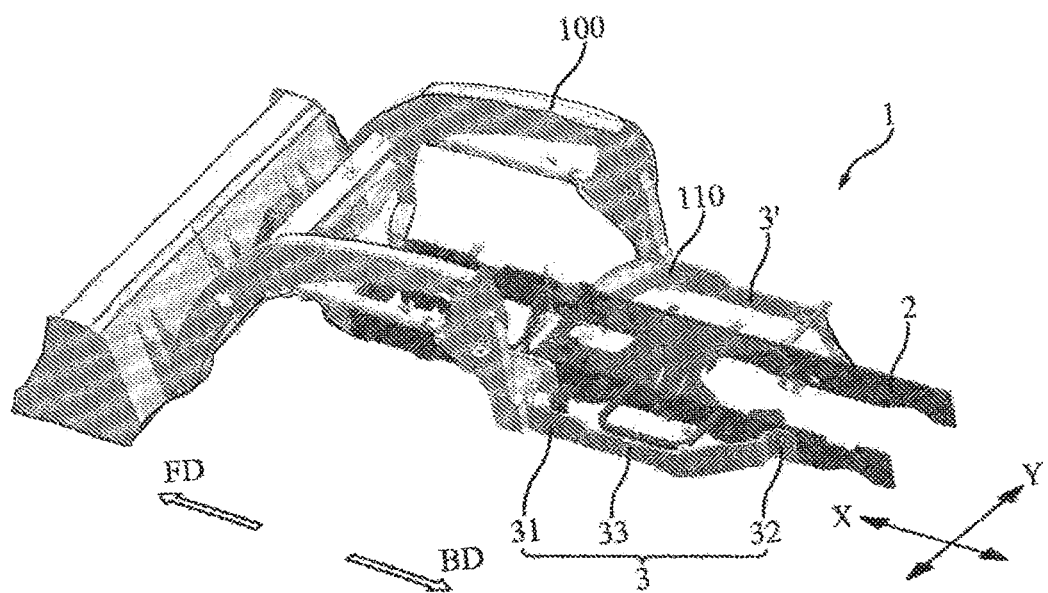
FIG. 2 is a schematic perspective view showing a configuration in which a frame apparatus for agricultural vehicles according to a first embodiment of the present invention supports a front working machine.

Referring to FIGS. 1 and 2, a frame apparatus 1 for agricultural vehicles according to a first embodiment of the present invention is installed in an agricultural vehicle 10. The agricultural vehicle 10 is used to cultivate crops required for human life using soil. The agricultural vehicle 10 may include a tractor, a combine, and the like.

The frame apparatus 1 for agricultural vehicles according to the first embodiment of the present invention may include an engine frame 2 configured to support an engine (not shown), a front frame 3 connected to each of a front working machine 100 and the engine frame 2 to support the front working machine 100 mounted on the agricultural vehicle 10, and a rear frame 4 connected to each of a rear working machine 200 and the engine frame 2 to support the rear working machine 200 mounted on the agricultural vehicle 10. Each of the front frame 3 and the rear frame 4 may be detachably connected to the engine frame 2.

Therefore, the frame apparatus 1 for agricultural vehicles according to the first embodiment of the present invention may have the following operational effects.

First, the frame apparatus 1 for agricultural vehicles according to the first embodiment of the present invention is implemented so that the engine frame 2, the front frame 3 and the rear frame 4 share a load exerted by the front working machine 100 and the rear working machine 200 in order to support the front working machine 100 and the rear working machine 200. Accordingly, the frame apparatus 1 for agricultural vehicles according to the first embodiment of the present invention may reduce deformation in the engine frame 2, and may also prevent the engine frame 2 from being damaged and broken. Therefore, the frame apparatus 1 for agricultural vehicles according to the first embodiment of the present invention may contribute to enhancing the durability of the agricultural vehicle 10.

Second, the frame apparatus 1 for agricultural vehicles according to the first embodiment of the present invention is implemented to reduce a degree of increase in weight exerted on the engine frame 2 in order to achieve a supporting force to support the front working machine 100 and the rear working machine 200. When both the front working machine 100 and the rear working machine 200 are mounted on the agricultural vehicle 10, the front frame 3 and the rear frame 4 connected to the engine frame 2 share a load exerted by the front working machine 100 and the rear working machine 200 in order to support the front working machine 100 and the rear working machine 200. Also, when only the front working machine 100 is mounted on the agricultural vehicle 10, the front frame 3 connected to the engine frame 2 may share a load exerted by the front working machine 100 in order to support the front working machine 100. In this case, when the rear frame 4 is detached from the engine frame 2, only the front frame 3 may be connected to the engine frame 2, as shown in FIG. 2.

Therefore, the frame apparatus 1 for agricultural vehicles according to the first embodiment of the present invention may provide a sufficient supporting force to support the front working machine 100 and the rear working machine 200 using the front frame 3 and the rear frame 4 by reducing an increase in weight of the engine frame 2 or without increasing the weight of the engine frame 2. Also, when only the front working machine 100 is mounted on the agricultural vehicle 10, the frame apparatus 1 for agricultural vehicles according to the first embodiment of the present invention is implemented to reduce the total weight of the engine frame 2 by detachment of the rear frame 4. Therefore, the frame apparatus 1 for agricultural vehicles according to the first embodiment of the present invention may contribute to improving the fuel economy of the agricultural vehicle 10 by preventing the fuel economy of the agricultural vehicle 10 from being reduced due to an unnecessary increase in the total weight of the engine frame 2. Also, the frame apparatus 1 for agricultural vehicles according to the first embodiment of the present invention may contribute to maintaining the overall balance of the agricultural vehicle 10 by means of the front frame 3 and the rear frame 4.

Hereinafter, the engine frame 2, the front frame 3, and the rear frame 4 in the frame apparatus 1 for agricultural vehicles according to the first embodiment of the present invention will be described in detail with reference to the accompanying drawings.

Referring to FIGS. 1 and 2, the engine frame 2 is configured to support the engine. The engine frame 2 may be installed in a vehicle body 11 of the agricultural vehicle 10. The engine frame 2 may support machinery installed in the vehicle body 11 as well as the engine. That is, the engine frame 2 may function as a framework of the agricultural vehicle 10. Wheels 12 may be installed at the vehicle body 11. As a driving force generated by the engine is transferred to the wheels 12, the vehicle body 11 may move in a traveling direction (an X-axis direction). In this case, the traveling direction (an X-axis direction) may be a parallel axial direction with respect to a forward direction in which the vehicle body 11 moves forward (a FD arrow direction), and a backward direction in which the vehicle body 11 moves backward (a BD arrow direction). A driver's seat 13 configured to allow a driver to be seated may be provided in the vehicle body 11. As the driver sits in the driver's seat 13 to handle a steering device, an operating device, and the like, the agricultural vehicle 10 may perform a predetermined operation. Although not shown, a transmission configured to connect the engine and the wheels 12 may be installed at the engine frame 2.

Referring to FIGS. 1 to 5, the front frame 3 is configured to support the front working machine 100 mounted on the agricultural vehicle 10. The front frame 3 may be connected to each of the front working machine 100 and the engine frame 2. Accordingly, the front frame 3 and the engine frame 2 may share a load exerted by the front working machine 100 in order to support the front working machine 100. Therefore, the frame apparatus 1 for agricultural vehicles according to the first embodiment of the present invention may be implemented to reduce an increase in weight of the engine frame 2 and achieve a sufficient supporting force for the front working machine 100 as well.

The front frame 3 may be detachably connected to the engine frame 2. Accordingly, when the front working machine 100 is not mounted on the agricultural vehicle 10, the front frame 3 may be detached from the engine frame 2. Therefore, the frame apparatus 1 for agricultural vehicles according to the first embodiment of the present invention is implemented to reduce the total weight of the engine frame 2 by detachment of the front frame 3 when only the rear working machine 200 is mounted on the agricultural vehicle 10. Therefore, the frame apparatus 1 for agricultural vehicles according to the first embodiment of the present invention may contribute to improving the fuel economy of the agricultural vehicle 10 and simultaneously maintaining the overall balance of the agricultural vehicle 10. The front frame 3 may be detachably connected to the engine frame 2 and the front working machine 100 by a fastening means.

The front frame 3 may support the front working machine 100 installed so that the front working machine 100 is arranged in front of the agricultural vehicle 10 (in a FD arrow direction). For example, the front working machine 100 may be a loader working machine used to remove or deliver soil in front of the agricultural vehicle 10 (in a FD arrow direction). One side of the front frame 3 may be connected to the front working machine 100, and the other side of the front frame 3 may be connected to the engine frame 2. The other side of the front frame 3 may be connected to the engine frame 2 at a position at which the other side of the front frame 3 is spaced backward from the one side of the front frame 3 (in a BD arrow direction). Accordingly, the frame apparatus 1 for agricultural vehicles according to the first embodiment of the present invention is implemented to disperse a load exerted by the front working machine 100 in a backward direction (a BD arrow direction) of the engine frame 2 through the other side of the front frame 3 when the front working machine 100 is mounted at the front of the agricultural vehicle 10 (in a FD arrow direction). Therefore, the frame apparatus 1 for agricultural vehicles according to the first embodiment of the present invention may contribute to maintaining the balance between the front and rear of the agricultural vehicle 10. In this case, the front working machine 100 may be connected to one side of each of the engine frame 2 and the front frame 3. The front working machine 100 may also be connected to only the one side of the front frame 3.

The front frame 3 may be connected to each of the front working machine 100 and the engine frame 2 so that the front frame 3 is arranged at the outside of the engine frame 2. The outside of the engine frame 2 refers to an outer side of the engine frame 2 with respect to a first axial direction (a Y-axis direction) perpendicular to the traveling direction (an X-axis direction). That is, the outside of the engine frame 2 refers to a lateral side of the agricultural vehicle 10. Accordingly, the frame apparatus 1 for agricultural vehicles according to the first embodiment of the present invention may improve the ease of performing a process of connecting the front frame 3 and a process of detaching the front frame 3.

The front frame 3 may include a front support member 31.

The front support member 31 is configured to be connected to the front working machine 100. The front support member 31 may be connected to the front working machine 100 to support the front working machine 100. The front working machine 100 may be connected to each of the engine frame 2 and the front support member 31 so that the front working machine 100 may be supported by the engine frame 2 and the front frame 3. The front support member 31 may be connected to a connection member 110 of the front working machine 100 to support the front working machine 100. The connection member 110 may be formed to protrude backward from the front working machine 100 (in a BD arrow direction).

The front support member 31 may be generally formed in the form of a rectangular plate, but the present invention is not limited thereto. For example, the front support member 31 may also be formed in the form of plates having other shapes as long as the front support member 31 can be connected to the front working machine 100 to support the front working machine 100.

The front support member 31 may be connected to the front working machine 100 so that the front support member 31 is arranged at the outside of the front working machine 100. The outside of the front working machine 100 refers to an outer side of the front working machine 100 with respect to the first axial direction (a Y-axis direction). That is, the outside of the front working machine 100 refers to a lateral side of the agricultural vehicle 10. Accordingly, the frame apparatus 1 for agricultural vehicles according to the first embodiment of the present invention may improve the ease of performing a process of connecting the front support member 31 to the front working machine 100 and a process of detaching the front support member 31 from the front working machine 100. In this case, the front support member 31 may be connected to the front working machine 100 so that the front support member 31 is arranged at the outside of the front working machine 100 arranged at the outside of the engine frame 2.

A front support hole 311 (shown in FIG. 3) may be formed in the front support member 31. The front support hole 311 may be formed through the front support member 31. In this case, a front fastening hole (not shown) corresponding to the front support hole 311 may be formed in the front working machine 100. A front fastening means (not shown) may be inserted into the front support hole 311 and the front fastening hole, and fastened therein to fix the front support member 31 in the front working machine 100. The front fastening hole may be formed in the connection member 110.

The front frame 3 may include a front connection member 32.

The front connection member 32 is connected to the engine frame 2. The front connection member 32 may be connected to the engine frame 2 to support the front working machine 100 together with the engine frame 2.

The front connection member 32 may be generally formed in the form of a rectangular plate, but the present invention is not limited thereto. For example, the front connection member 32 may also be formed in the form of plates having other shapes as long as the front connection member 32 can be connected to the engine frame 2 to support the front working machine 100.

The front connection member 32 may be connected to the engine frame 2 so that the front connection member 32 is arranged at the outside of the engine frame 2. Therefore, the front connection member 32 may be disposed so that the front connection member 32 is arranged at a lateral side of the agricultural vehicle 10. Accordingly, the frame apparatus 1 for agricultural vehicles according to the first embodiment of the present invention may improve the ease of performing a process of connecting the front connection member 32 to the engine frame 2 and a process of detaching the front connection member 32 from the engine frame 2.

A front connection hole 321 (shown in FIG. 5) may be formed in the front connection member 32. The front connection hole 321 may be formed in the front connection member 32. In this case, a first fixing hole 21 (shown in FIG. 5) corresponding to the front connection hole 321 may be formed in the engine frame 2. A first fixing means 5 may be inserted into the front connection hole 321 and the first fixing hole 21. The first fixing means 5 may be inserted into the front connection hole 321 and the first fixing hole 21 to fix the front connection member 32 to the engine frame 2. The first fixing means 5 may also be inserted into the front connection hole 321 and the first fixing hole 21, and fastened therein to fix the front connection member 32 to the engine frame 2. In this case, screw threads may be formed in the first fixing means 5, an inner surface of the front connection member 32 in which the front connection hole 321 is formed, and an inner surface of the engine frame 2 in which the first fixing hole 21 is formed.

When the front frame 3 includes the front support member 31, the front connection member 32 may be connected to the engine frame 2 at a position at which the front connection member 32 is spaced backward from the front support member 31 (in a BD arrow direction). Accordingly, when the front working machine 100 is mounted at the front of the agricultural vehicle 10 (in a FD arrow direction), the frame apparatus 1 for agricultural vehicles according to the first embodiment of the present invention may be implemented to disperse a load exerted by the front working machine 100 in a backward direction (a BD arrow direction) of the engine frame 2 through the front connection member 32. Therefore, the frame apparatus 1 for agricultural vehicles according to the first embodiment of the present invention may contribute to maintaining the balance between the front and rear of the agricultural vehicle 10.

The front frame 3 may include a front reinforcement member 33.

The front reinforcement member 33 serves to connect the front support member 31 and the front connection member 32. The front reinforcement member 33 may be coupled to each of the front support member 31 and the front connection member 32 so that the front reinforcement member 33 is arranged between the front support member 31 and the front connection member 32. The front reinforcement member 33 is implemented to disperse a load exerted by the front working machine 100 in a backward direction (a BD arrow direction) of the engine frame 2 by transferring the load of the front working machine 100, which has been transferred through the front support member 31, to the front connection member 32. Therefore, the frame apparatus 1 for agricultural vehicles according to the first embodiment of the present invention may contribute to maintaining the balance between the front and rear of the agricultural vehicle 10. Also, the front reinforcement member 33 may enhance the rigidity of the front frame 3 by increasing the total size of the front frame 3. Therefore, the frame apparatus 1 for agricultural vehicles according to the first embodiment of the present invention may use the front frame 3 to more strongly support the load exerted by the front working machine 100.

The front reinforcement member 33 may be generally formed in the form of a rectangular plate, but the present invention is not limited thereto. For example, the front reinforcement member 33 may also be formed in the form of plates having other shapes as long as the front reinforcement member 33 can be configured to connect the front support member 31 and the front connection member 32. The front reinforcement member 33, the front support member 31, and the front connection member 32 may also be formed integrally. In this case, the front reinforcement member 33, the front support member 31, and the front connection member 32 may be implemented by bending a predetermined plate.

The front reinforcement member 33 may be disposed so that the front reinforcement member 33 is arranged at the outside of the engine frame 2. That is, the front reinforcement member 33 may be disposed so that the front reinforcement member 33 is arranged at a lateral side of the agricultural vehicle 10. Accordingly, the frame apparatus 1 for agricultural vehicles according to the first embodiment of the present invention may be implemented so that the front reinforcement member 33 is not interfered with or hindered while a process of connecting the front frame 3 or a process of detaching the front frame 3 is performed. Therefore, the frame apparatus 1 for agricultural vehicles according to the first embodiment of the present invention may improve the ease of performing the process of connecting the front frame 3 and the process of detaching the front frame 3. The front reinforcement member 33 may be disposed so that the front reinforcement member 33 is arranged at a position at which the front reinforcement member 33 is spaced apart from the engine frame 2 in the first axial direction (a Y-axis direction).

Here, the frame apparatus 1 for agricultural vehicles according to the first embodiment of the present invention may include a plurality of front frames 3. The front frames 3 and 3' (shown in FIG. 2) may be detachably connected to each of the front working machine 100 and the engine frame 2 so that the front frames 3 and 3' are arranged at the outside of the engine frame 2. In this case, the engine frame 2 may be disposed so that the engine frame 2 is arranged between the front frames 3 and 3' in the first axial direction (Y-axis direction). That is, the front frames 3 and 3' may be disposed so that the front frames 3 and 3' are arranged at both lateral sides of the agricultural vehicle 10. Therefore, the frame apparatus 1 for agricultural vehicles according to the first embodiment of the present invention may further enhance a supporting force for the load exerted by the front working machine 100 through the front frames 3 and 3', and may also improve the ease of performing a process of connecting the front frames 3 and 3' and a process of detaching the front frames 3 and 3'.

Referring to FIGS. 1 to 8, the rear frame 4 serves to support the rear working machine 200 mounted on the agricultural vehicle 10. The rear frame 4 may be connected to each of the rear working machine 200 and the engine frame 2. Accordingly, the rear frame 4 and the engine frame 2 may share a load exerted by the rear working machine 200 in order to support the rear working machine 200. Therefore, the frame apparatus 1 for agricultural vehicles according to the first embodiment of the present invention may be implemented to reduce an increase in weight of the engine frame 2 and simultaneously achieve a sufficient supporting force for the rear working machine 200.

The rear frame 4 may be detachably connected to the engine frame 2. Accordingly, when the rear working machine 200 is not mounted on the agricultural vehicle 10, the rear frame 4 may be detached from the engine frame 2. Therefore, when only the rear working machine 200 is mounted on the agricultural vehicle 10, the frame apparatus 1 for agricultural vehicles according to the first embodiment of the present invention may be implemented to reduce the total weight of the engine frame 2 by detachment of the rear frame 4. Therefore, the frame apparatus 1 for agricultural vehicles according to the first embodiment of the present invention may contribute to improving the fuel economy of the agricultural vehicle 10 and simultaneously maintaining the overall balance of the agricultural vehicle 10. The rear frame 4 may be detachably connected to the engine frame 2 and the rear working machine 200 by a fastening means.

The rear frame 4 may support the rear working machine 200 mounted so that the rear working machine 200 is arranged in the rear of the agricultural vehicle 10 (in a BD arrow direction). For example, the rear working machine 200 may be a backhoe working machine used to perform an excavation process in a backward direction (a BD arrow direction) of the agricultural vehicle 10. One side of the rear frame 4 may be connected to the rear working machine 200, and the other side of the rear frame 4 may be connected to the engine frame 2. The other side of the rear frame 4 may be connected to the engine frame 2 at a position at which the other side of the rear frame 4 is spaced forward from the one side of the rear frame 4 (in a FD arrow direction). Accordingly, when the rear working machine 200 is mounted at the rear of the agricultural vehicle 10 (in a BD arrow direction), the frame apparatus 1 for agricultural vehicles according to the first embodiment of the present invention may be implemented to disperse a load exerted by the rear working machine 200 in a forward direction (a FD arrow direction) of the engine frame 2 through the other side of the rear frame 4. Therefore, the frame apparatus 1 for agricultural vehicles according to the first embodiment of the present invention may contribute to maintaining the balance between the front and rear of the agricultural vehicle 10. In this case, the rear working machine 200 may be connected to one side of each of the engine frame 2 and the rear frame 4. The rear working machine 200 may also be connected to only the one side of the front frame 3.

When the rear frame 4 is connected to support a backhoe working machine installed so that the backhoe working machine is arranged behind the agricultural vehicle 10 (in a BD arrow direction), the front frame 3 may be connected to support a loader working machine installed so that the loader working machine is arranged in front of the agricultural vehicle 10 (in a FD arrow direction).

The rear frame 4 may be connected to each of the rear working machine 200 and the engine frame 2 so that the rear frame 4 is arranged at the outside of the engine frame 2. That is, the rear frame 4 may be disposed so that the rear frame 4 is arranged at a lateral side of the agricultural vehicle 10. Accordingly, the frame apparatus 1 for agricultural vehicles according to the first embodiment of the present invention may improve the ease of performing a process of connecting the rear frame 4 and a process of detaching the rear frame 4.

The rear frame 4 may include a rear support member 41.

The rear support member 41 is configured to be connected to the rear working machine 200. The rear support member 41 may be connected to the rear working machine 200 to support the rear working machine 200. The rear working machine 200 may be connected to each of the engine frame 2 and the rear support member 41 so that the rear working machine 200 is supported by the engine frame 2 and the rear frame 4.

The rear support member 41 may be generally formed in the form of a rectangular plate, but the present invention is not limited thereto. For example, the rear support member 41 may also be formed in the form of plates having other shapes as long as the rear support member 41 can be connected to the rear working machine 200 to support the rear working machine 200.

The rear support member 41 may be connected to the rear working machine 200 so that the rear support member 41 is arranged at the outside of the rear working machine 200. The outside of the rear working machine 200 refers to an outer side of the rear working machine 200 with respect to the first axial direction (a Y-axis direction). That is, the outside of the rear working machine 200 refers to a lateral side of the agricultural vehicle 10. Accordingly, the frame apparatus 1 for agricultural vehicles according to the first embodiment of the present invention may improve the ease of performing a process of connecting the rear support member 41 to the rear working machine 200 and a process of detaching the rear support member 41 from the rear working machine 200. In this case, the rear support member 41 may be connected to the rear working machine 200 so that the rear support member 41 is arranged at the outside of the rear working machine 200 arranged at the outside of the engine frame 2.

A rear support hole 411 (shown in FIG. 6) may be formed in the rear support member 41. The rear support hole 411 may be formed through the rear support member 41. In this case, a rear fastening hole (not shown) corresponding to the rear support hole 411 may be formed in the rear working machine 200. A rear fastening means (not shown) may be inserted into the rear support hole 411 and the rear fastening hole, and fastened therein to fix the rear support member 41 to the rear working machine 200.

The rear frame 4 may include a rear connection member 42.

The rear connection member 42 is connected to the engine frame 2. The rear connection member 42 may be connected to the engine frame 2 to support the rear working machine 200 together with the engine frame 2.

The rear connection member 42 may be generally formed in the form of a rectangular plate, but the present invention is not limited thereto. For example, the rear connection member 42 may also be formed in the form of plates having other shapes as long as the rear connection member 42 can be connected to the engine frame 2 to support the rear working machine 200.

The rear connection member 42 may be connected to the engine frame 2 so that the rear connection member 42 is arranged at the outside of the engine frame 2. Accordingly, the rear connection member 42 may be disposed so that the rear connection member 42 is arranged at a lateral side of the agricultural vehicle 10. Therefore, the frame apparatus 1 for agricultural vehicles according to the first embodiment of the present invention may improve the ease of performing a process of connecting the rear connection member 42 to the engine frame 2 and a process of detaching the rear connection member 42 from the engine frame 2.

A rear connection hole 421 (shown in FIG. 5) may be formed in the rear connection member 42. The rear connection hole 421 may be formed through the rear connection member 42. In this case, a rear fixing hole (not shown) corresponding to the rear connection hole 421 may be formed in the engine frame 2. A rear fixing means (not shown) may be inserted into the rear connection hole 421 and the rear fixing hole. The rear fixing means may be inserted into the rear connection hole 421 and the rear fixing hole to fix the rear connection member 42 to the engine frame 2. The rear fixing means may also be inserted into the rear connection hole 421 and the rear fixing hole, and fastened therein to fix the rear connection member 42 to the engine frame 2. In this case, screw threads may be formed in the rear fixing unit, an inner surface of the rear connection member 42 in which the rear connection hole 421 is formed, and an inner surface of the engine frame 2 in which the rear fixing hole is formed.

When the rear frame 4 includes the rear support member 41, the rear connection member 42 may be connected to the engine frame 2 at a position at which the rear connection member 42 is spaced forward from the rear support member 41 (in a FD arrow direction). Accordingly, when the rear working machine 200 is mounted at the rear of the agricultural vehicle 10 (in a BD arrow direction), the frame apparatus 1 for agricultural vehicles according to the first embodiment of the present invention may be implemented to disperse a load exerted by the rear working machine 200 in a forward direction (a FD arrow direction) of the engine frame 2 through the rear connection member 42. Therefore, the frame apparatus 1 for agricultural vehicles according to the first embodiment of the present invention may contribute to maintaining the balance between the front and rear of the agricultural vehicle 10.

Referring to FIGS. 1 to 10, the rear connection member 42 and the front connection member 32 may be disposed to overlap each other so that the rear connection member 42 and the front connection member 32 are detachably connected to the engine frame 2. Accordingly, regions of the rear connection member 42 and the front connection member 32 which are connected to the engine frame 2 may be implemented as a support structure consisting of three parts. Therefore, the frame apparatus 1 for agricultural vehicles according to the first embodiment of the present invention may further enhance a supporting force for the load exerted by the front working machine 100 and the rear working machine 200.

Figure 9:
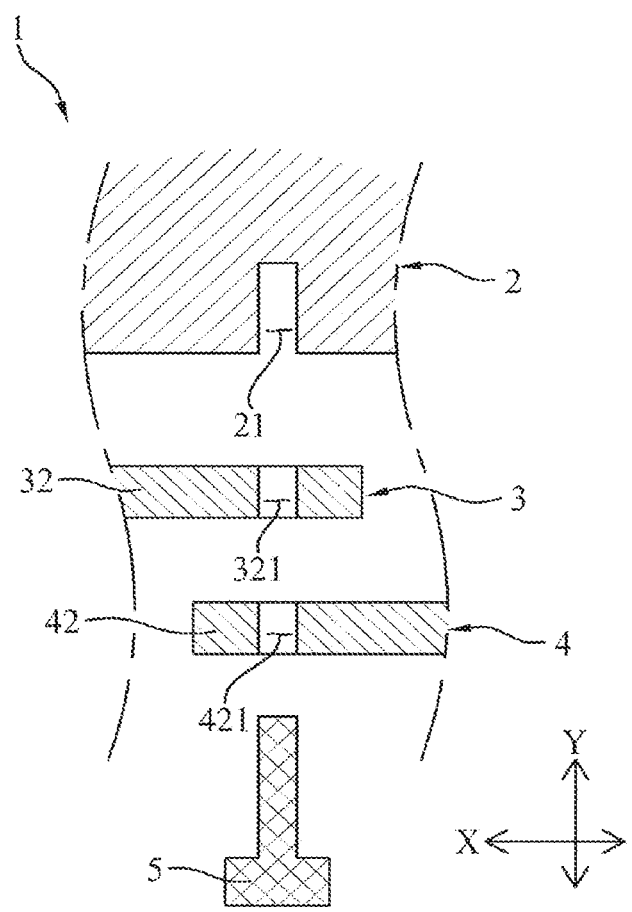
FIGS. 9 and 10 are schematic top cross-sectional views for explaining a connection relationship between the front frame, the rear frame and the engine frame in the frame apparatus for agricultural vehicles according to the first embodiment of the present invention.

As shown in FIG. 9, the rear connection member 42 may be disposed so that the rear connection member 42 is arranged at the outside of the front connection member 32. The outside of the front connection member 32 refers to an outer side of the engine frame 2 with respect to the first axial direction (a Y-axis direction). In this case, the rear support member 41 may be connected to the rear working machine 200 whose detachment frequency with respect to the agricultural vehicle 10 is greater than that of the front working machine 100. The detachment frequency with respect to the agricultural vehicle 10 refers to the number of times of detachment with respect to the agricultural vehicle 10. Therefore, the greater detachment frequency with respect to the agricultural vehicle 10 refers to a greater number of times of detachment with respect to the agricultural vehicle 10 within a predetermined period of time. For example, when there are not many places that require an excavation process depending on a working environment of the agricultural vehicle 10, a backhoe working machine may be detached from the agricultural vehicle 10 while the excavation process is not performed in the places requiring the excavation process. In this case, the rear support member 41 may be connected to the backhoe working machine, and the rear connection member 42 may be disposed so that the rear connection member 42 is arranged at the outside of the front connection member 32.

Accordingly, the rear connection member 42 may be implemented to be detached from the engine frame 2 even in a state in which the front connection member 32 is not detached from the engine frame 2. That is, the rear frame 4 may be detached from the engine frame 2 in a state in which the front frame 3 is connected to the engine frame 2. Also, the rear frame 4 may be connected to the engine frame 2 in a state in which the front frame 3 is connected to the engine frame 2.

Therefore, when the rear working machine 200 whose detachment frequency with respect to the agricultural vehicle 10 is greater than that of the front working machine 100 is mounted and detached, the frame apparatus 1 for agricultural vehicles according to the first embodiment of the present invention is implemented to mount and detach the rear working machine 200 in a state in which the front working machine 100 is mounted on the engine frame 2. Accordingly, the frame apparatus 1 for agricultural vehicles according to the first embodiment of the present invention may improve the ease of performing a process of mounting and detaching the rear working machine 200. Also, the frame apparatus 1 for agricultural vehicles according to the first embodiment of the present invention may shorten the time taken to perform the process of mounting and detaching the rear working machine 200, thereby enhancing an operation rate of the agricultural vehicle 10.

Figure 10:
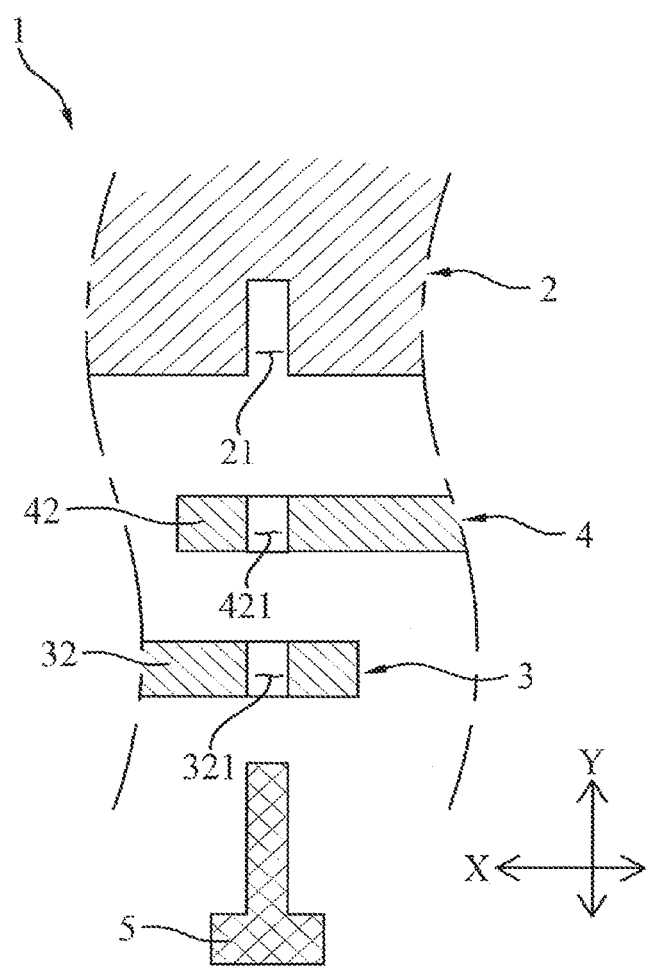

As shown in FIG. 10, the front connection member 32 may be disposed so that the front connection member 32 is arranged at the outside of the rear connection member 42. The outside of the rear connection member 42 refers to an outer side of the engine frame 2 with respect to the first axial direction (a Y-axis direction). In this case, the front support member 31 may be connected to the front working machine 100 whose detachment frequency with respect to the agricultural vehicle 10 is greater than that of the rear working machine 200. Accordingly, the front connection member 32 may be implemented to be detached from the engine frame 2 even in a state in which the rear connection member 42 is not detached from the engine frame 2. That is, the front frame 3 may be detached from the engine frame 2 in a state in which the rear frame 4 is connected to the engine frame 2. Also, the front frame 3 may be connected to the engine frame 2 in a state in which the rear frame 4 is connected to the engine frame 2.

Accordingly, when the front working machine 100 whose detachment frequency with respect to the agricultural vehicle 10 is greater than that of the rear working machine 200 is mounted and detached, the frame apparatus 1 for agricultural vehicles according to the first embodiment of the present invention is implemented to mount and detach the front working machine 100 in a state in which the rear working machine 200 is mounted on the engine frame 2. Therefore, the frame apparatus 1 for agricultural vehicles according to the first embodiment of the present invention may improve the ease of performing a process of mounting and detaching the front working machine 100. Also, the frame apparatus 1 for agricultural vehicles according to the first embodiment of the present invention may shorten the time taken to perform the process of mounting and detaching the front working machine 100, thereby enhancing an operation rate of the agricultural vehicle 10.

Referring to FIGS. 9 and 10, when the rear connection member 42 and the front connection member 32 are disposed to overlap each other, the rear connection member 42 and the front connection member 32 may be fixed to the engine frame 2 by the first fixing means 5. The first fixing means 5 may be inserted into the front connection hole 321, the rear connection hole 421, and the first fixing hole 21 to fix the front connection member 32 and the rear connection member 42 to the engine frame 2. Accordingly, the frame apparatus 1 for agricultural vehicles according to the first embodiment of the present invention may improve the ease of performing a process of fixing the front connection member 32 and the rear connection member 42 to the engine frame 2. The first fixing means 5 may be inserted into the front connection hole 321, the rear connection hole 421, and the first fixing hole 21, and fastened therein to fix the front connection member 32 and the rear connection member 42 to the engine frame 2. In this case, screw threads may be formed in the first fixing means 5, an inner surface of the front connection member 32 in which the front connection hole 321 is formed, an inner surface of the rear connection member 42 in which the rear connection hole 421 is formed, and an inner surface of the engine frame 2 in which the first fixing hole 21 is formed.

Referring to FIGS. 1 to 10, the rear frame 4 may include a rear reinforcement member 43.

The rear reinforcement member 43 serves to connect the rear support member 41 and the rear connection member 42. The rear reinforcement member 43 may be coupled to each of the rear support member 41 and the rear connection member 42 so that the rear reinforcement member 43 is arranged between the rear support member 41 and the rear connection member 42. The rear reinforcement member 43 is implemented to disperse a load exerted by the rear working machine 200 in a forward direction (a FD arrow direction) of the engine frame 2 by transferring the load of the rear working machine 200, which has been transferred through the rear support member 41, to the rear connection member 42. Therefore, the frame apparatus 1 for agricultural vehicles according to the first embodiment of the present invention may contribute to maintaining the balance between the front and rear of the agricultural vehicle 10. Also, the rear reinforcement member 43 may enhance the rigidity of the rear frame 4 by increasing the total size of the rear frame 4. Therefore, the frame apparatus 1 for agricultural vehicles according to the first embodiment of the present invention may use the rear frame 4 to more strongly support the load exerted by the rear working machine 200.

The rear reinforcement member 43 may be generally formed in the form of a rectangular plate, but the present invention is not limited thereto. For example, the rear reinforcement member 43 may also be formed in the form of plates having other shapes as long as the rear reinforcement member 43 can be configured to connect the rear support member 41 and the rear connection member 42. The rear reinforcement member 43, the rear support member 41, and the rear connection member 42 may also be formed integrally. In this case, the rear reinforcement member 43, the rear support member 41, and the rear connection member 42 may be implemented by bending a predetermined plate.

The rear reinforcement member 43 may be disposed so that the rear reinforcement member 43 is arranged at the outside of the engine frame 2. That is, the rear reinforcement member 43 may be disposed so that the rear reinforcement member 43 is arranged at a lateral side of the agricultural vehicle 10. Accordingly, the frame apparatus 1 for agricultural vehicles according to the first embodiment of the present invention may be implemented so that the rear reinforcement member 43 is not interfered with or hindered while a process of connecting the rear frame 4 or a process of detaching the rear frame 4 are performed. Therefore, the frame apparatus 1 for agricultural vehicles according to the first embodiment of the present invention may improve the ease of performing the process of connecting the rear frame 4 and the process of detaching the rear frame 4. The rear reinforcement member 43 may be disposed so that the rear reinforcement member 43 is arranged at a position at which the rear reinforcement member 43 is spaced apart from the engine frame 2 in the first axial direction (a Y-axis direction).

Figure 6:
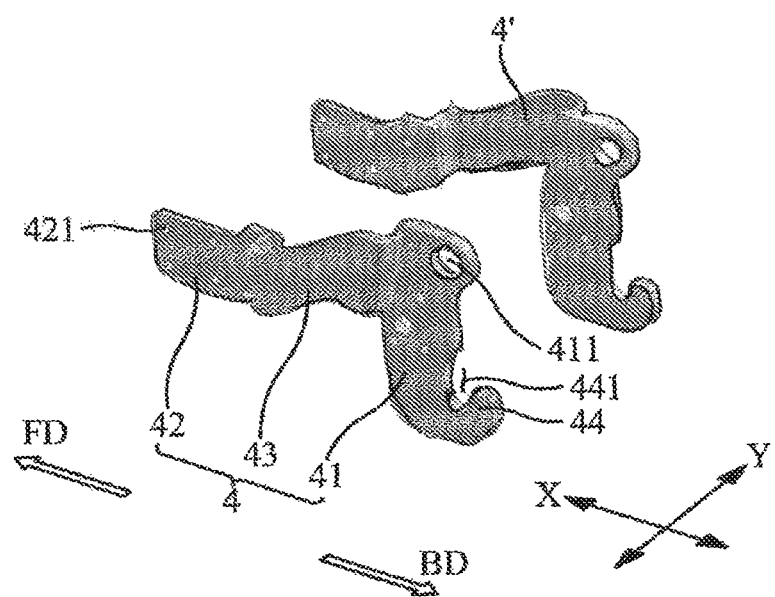
FIG. 6 is a schematic perspective view of a rear frame in the frame apparatus for agricultural vehicles according to the first embodiment of the present invention.
Figure 7:
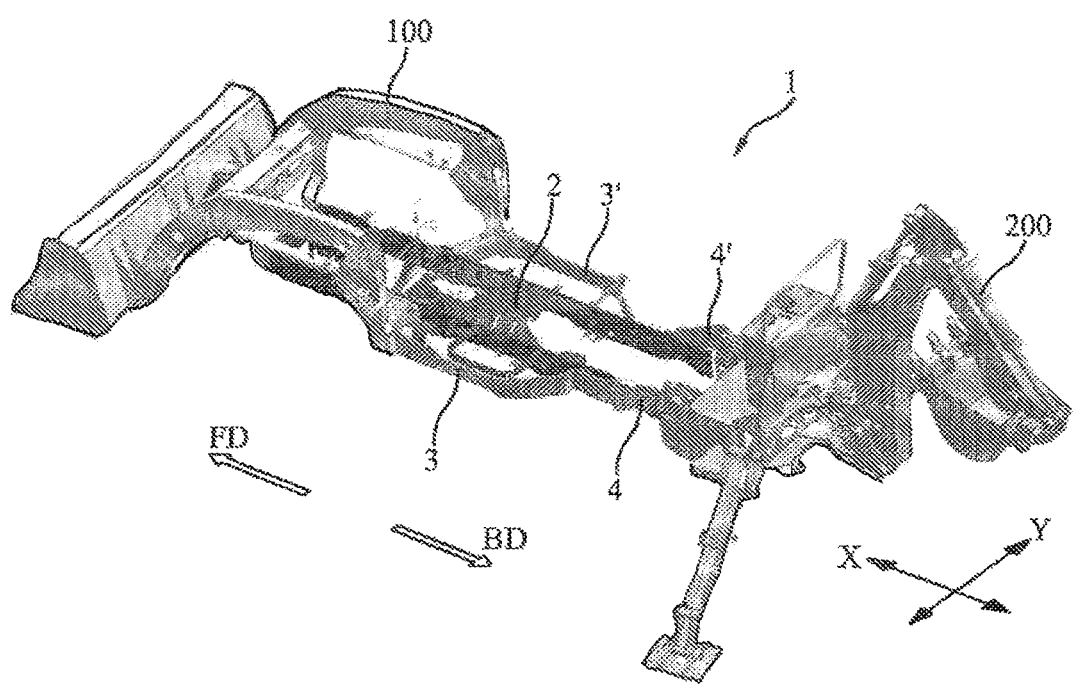
FIG. 7 is a schematic perspective view showing a configuration in which the frame apparatus for agricultural vehicles according to the first embodiment of the present invention supports a front working machine and a rear working machine.
Figure 8:
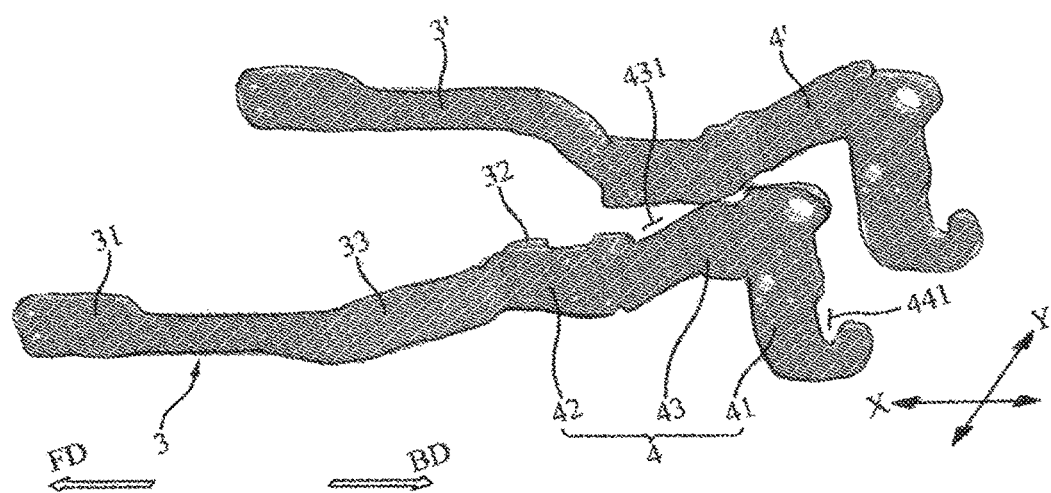
FIG. 8 is a schematic perspective view of the front frame and the rear frame in the frame apparatus for agricultural vehicles according to the first embodiment of the present invention.

Referring to FIGS. 1 to 10, the rear frame 4 may include a mounting member 44 (shown in FIG. 6).

The mounting member 44 serves to support the rear working machine 200. The rear frame 4 may use the rear connection member 42 and the mounting member 44 to support different regions of the rear working machine 200.

Accordingly, the frame apparatus 1 for agricultural vehicles according to the first embodiment of the present invention is implemented to further enhance a supporting force for the rear working machine 200. The mounting member 44 may be formed to protrude from the rear connection member 42. When the rear working machine 200 is mounted at the rear of the agricultural vehicle 10 (in a BD arrow direction), the mounting member 44 may be formed to protrude backward from the rear connection member 42 (in a BD arrow direction).

The mounting member 44 may include a mounting groove 441 (shown in FIG. 6).

The rear working machine 200 is configured to be inserted into the mounting groove 441. The rear working machine 200 may be inserted into the mounting groove 441 so that the rear working machine 200 is supported by the mounting member 44. The mounting member 44 may be formed in a hook shape so that the rear working machine 200 may be inserted by the mounting groove 441, but the present invention is not limited thereto. For example, the mounting member 44 may be formed in other shapes as long as the mounting member 44 can be configured to support the rear working machine 200.

Here, the frame apparatus 1 for agricultural vehicles according to the first embodiment of the present invention may include a plurality of rear frames 4. The rear frames 4 and 4' (shown in FIG. 7) may be detachably connected to each of the rear working machine 200 and the engine frame 2 so that the rear frames 4 and 4' are arranged at the outside of the engine frame 2. In this case, the engine frame 2 may be disposed so that the engine frame 2 is arranged between the rear frames 4 and 4' in the first axial direction (a Y-axis direction). That is, the rear frames 4 and 4' may be disposed so that the rear frames 4 and 4' are arranged at both lateral sides of the agricultural vehicle 10. Therefore, the frame apparatus 1 for agricultural vehicles according to the first embodiment of the present invention may further enhance a supporting force for the load exerted by the rear working machine 200 through the rear frames 4 and 4', and may also improve the ease of performing a process of connecting the rear frames 4 and 4' and a process of detaching the rear frames 4 and 4'.

Here, a frame apparatus 1 for agricultural vehicles according to a modified first embodiment of the present invention may also be implemented to include only the engine frame 2 and the front frame 3. In this case, the front frame 3 may be detachably connected to each of a loader working machine and the engine frame 2 to support the loader working machine. The front frame 3 may include the front connection hole 321. Accordingly, when the rear frame 4 configured to support the backhoe working machine is optionally provided, the rear frame 4 may be connected to the engine frame 2 using the front connection hole 321.

Here, a frame apparatus 1 for agricultural vehicles according to another modified first embodiment of the present invention may also be implemented to include only the engine frame 2 and the rear frame 4. In this case, the rear frame 4 may be detachably connected to each of a backhoe working machine and the engine frame 2 to support the backhoe working machine. The rear frame 4 may include the rear connection hole 421. Accordingly, when the front frame 3 configured to support the loader working machine is optionally provided, the front frame 3 may be connected to the engine frame 2 using the rear connection hole 421.

Second Embodiment

Figure 11:
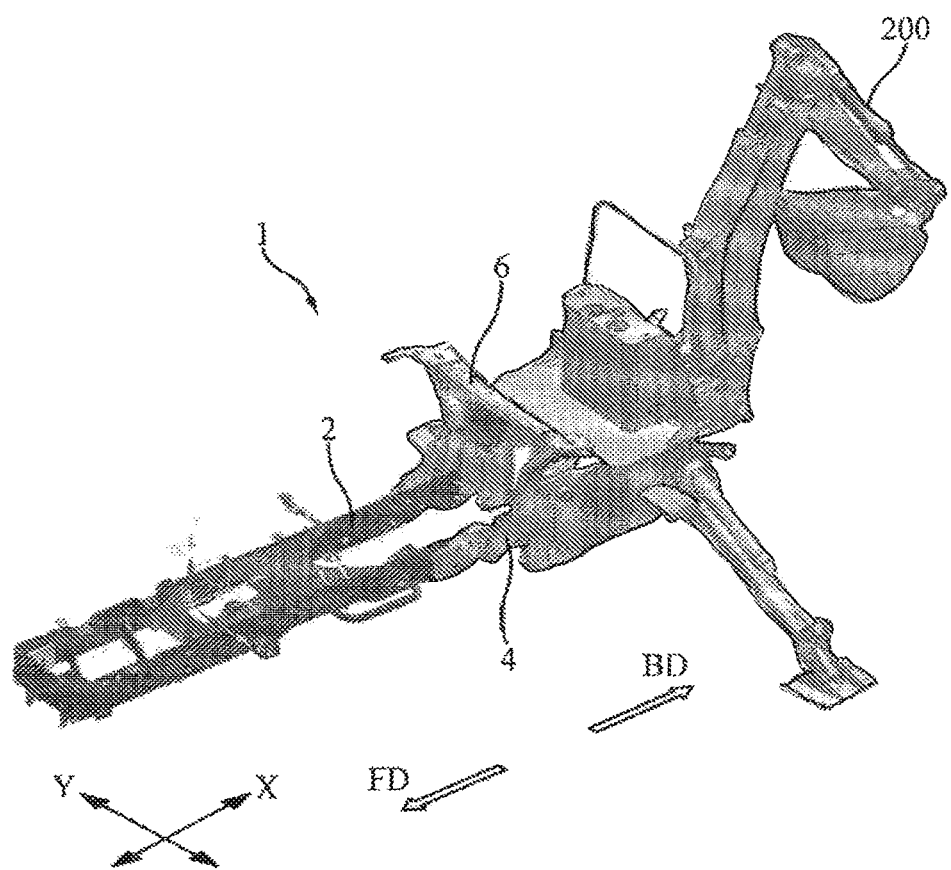
FIG. 11 is a schematic perspective view showing a configuration in which a frame apparatus for agricultural vehicles according to a second embodiment of the present invention supports a rear working machine.
Figure 12:
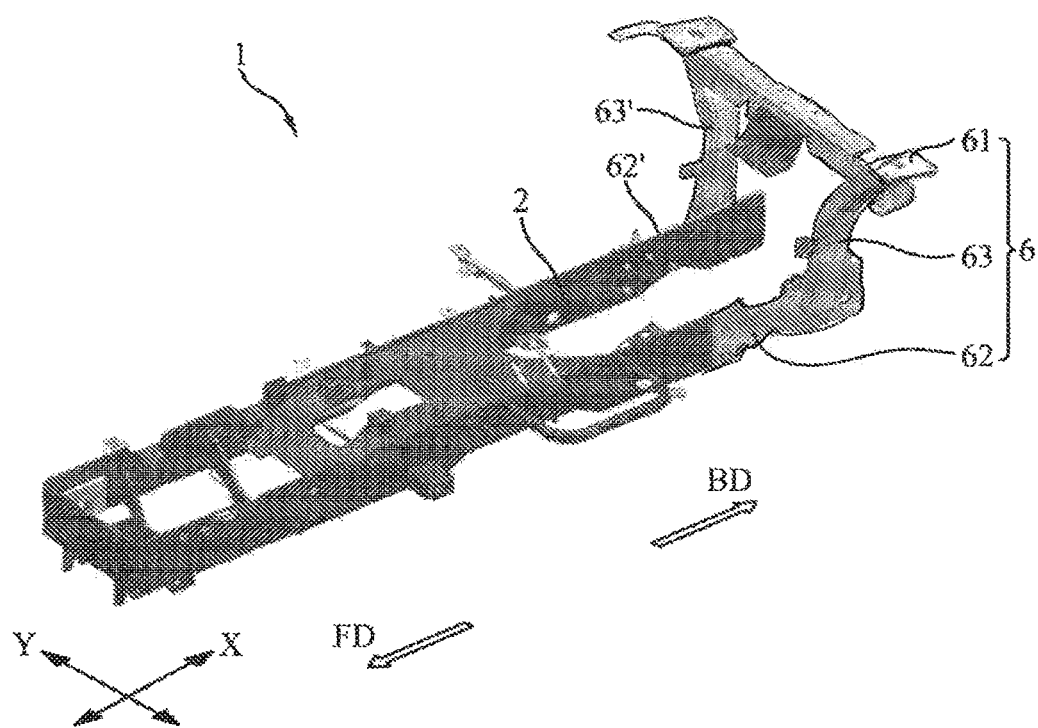
FIG. 12 is a schematic perspective view of the frame apparatus for agricultural vehicles according to the second embodiment of the present invention.
Figure 13:
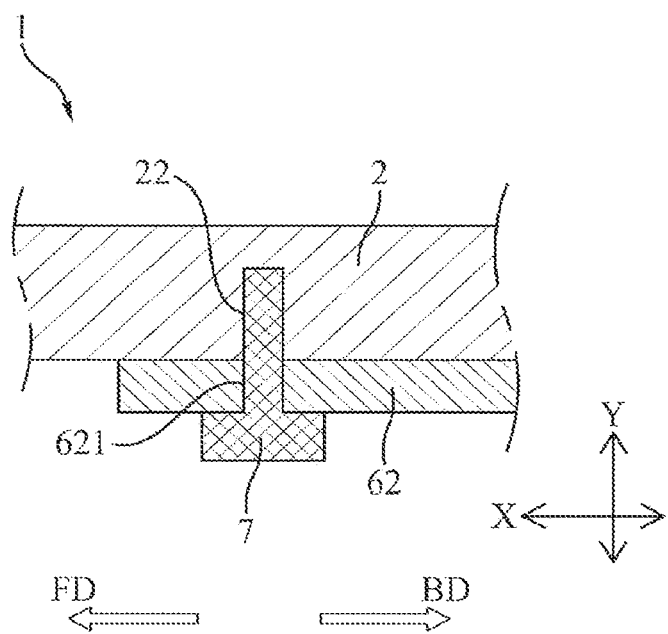
FIG. 13 is a schematic top cross-sectional view for explaining a connection relationship between a protection frame and an engine frame in the frame apparatus for agricultural vehicles according to the second embodiment of the present invention.
Figure 14:
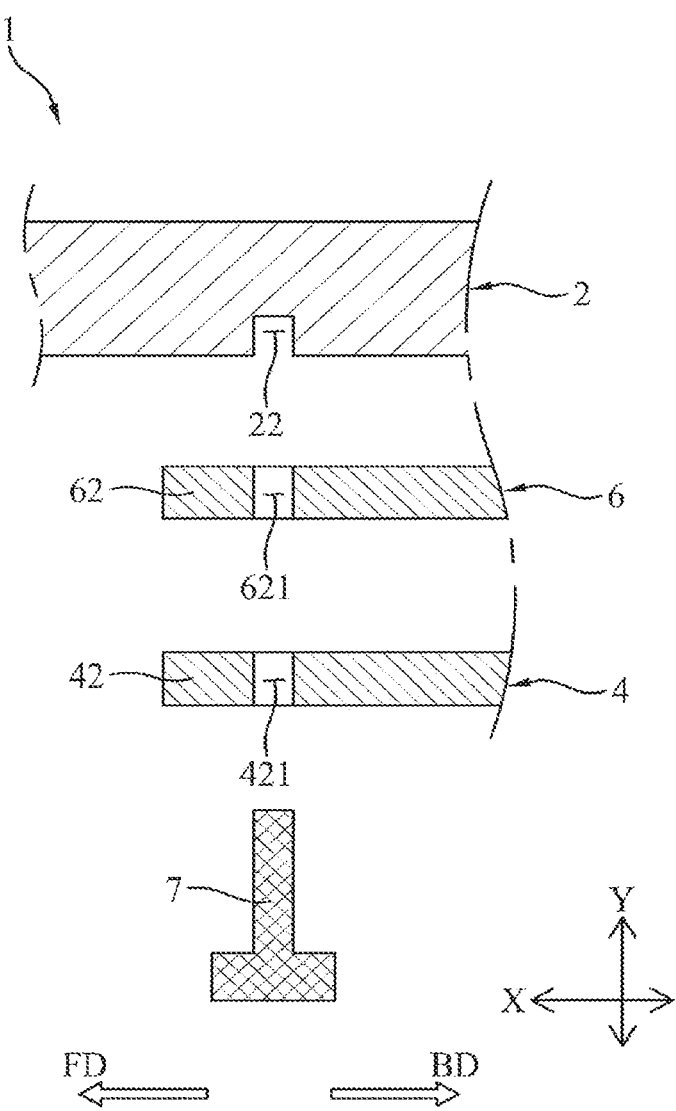
FIG. 14 is a schematic top cross-sectional view for explaining a connection relationship between the protection frame, a rear frame and the engine frame in the frame apparatus for agricultural vehicles according to the second embodiment of the present invention.

Referring to FIGS. 1, 11 and 12, a frame apparatus 1 for agricultural vehicles according to a second embodiment of the present invention is installed in the agricultural vehicle 10. The frame apparatus 1 for agricultural vehicles according to the second embodiment of the present invention includes a protection frame, and may optionally include the front frame 3 (shown in FIG. 2), compared to the aforementioned first embodiment. Hereinafter, in describing the frame apparatus 1 for agricultural vehicles according to the second embodiment of the present invention, configurations of the parts which differ in comparison with the aforementioned first embodiment will be described for clarity.

In addition to the engine frame 2 and the rear frame 4, the frame apparatus 1 for agricultural vehicles according to the second embodiment of the present invention may include a protection frame 6 connected to each of a protection unit 300 configured to protect the driver's seat 13 (shown in FIG. 1) and the engine frame 2 to support the protection unit. The rear frame 4 may be detachably connected to the engine frame 2.

Accordingly, the frame apparatus 1 for agricultural vehicles according to the second embodiment of the present invention may have the following operational effects.

First, the frame apparatus 1 for agricultural vehicles according to the second embodiment of the present invention is implemented so that the engine frame 2, the protection frame 6 and the rear frame 4 share a load exerted by the protection unit 300 and the rear working machine 200 in order to support the protection unit 300 and the rear working machine 200. Accordingly, the frame apparatus 1 for agricultural vehicles according to the second embodiment of the present invention may reduce deformation in the engine frame 2, and may also prevent the engine frame 2 from being damaged and broken. Therefore, the frame apparatus 1 for agricultural vehicles according to the second embodiment of the present invention may contribute to enhancing the durability of the agricultural vehicle 10.

Figure 3:
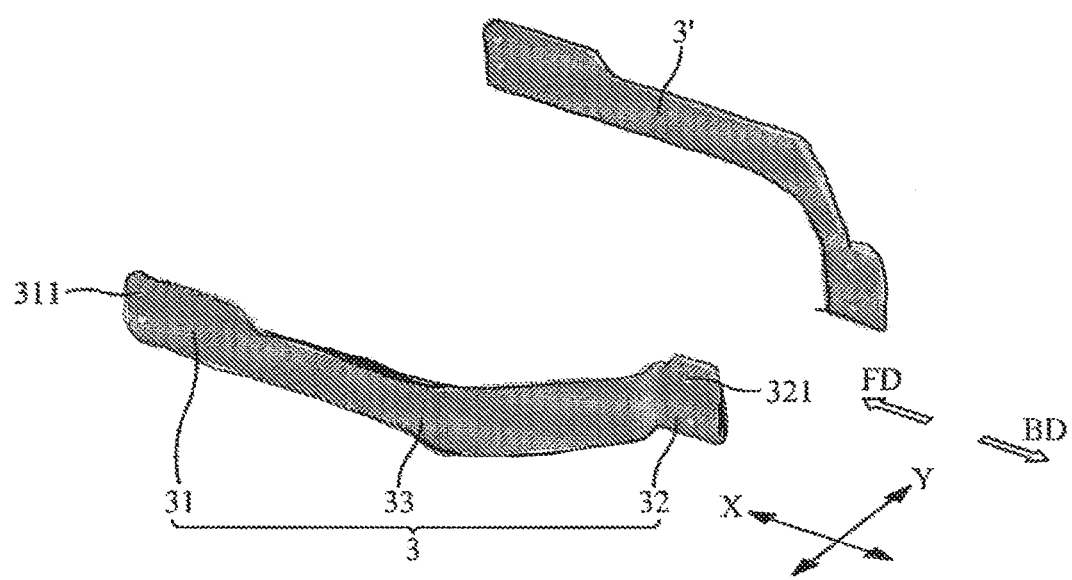
FIG. 3 is a schematic perspective view of a front frame in the frame apparatus for agricultural vehicles according to the first embodiment of the present invention.
Figure 4:
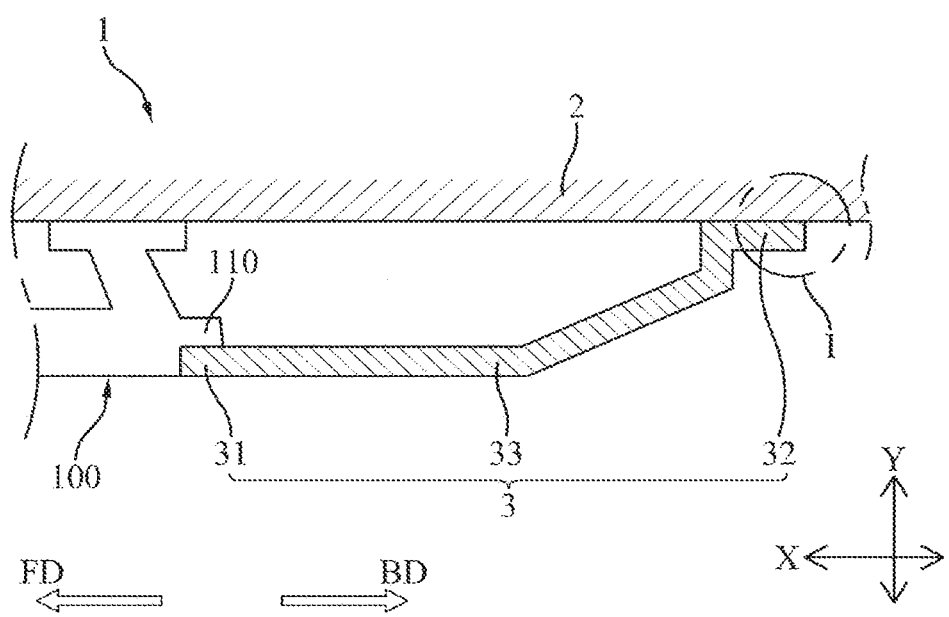
FIG. 4 is a schematic top cross-sectional view showing a configuration in which the front frame is connected to a front working machine and an engine frame in the frame apparatus for agricultural vehicles according to the first embodiment of the present invention.
Figure 5:
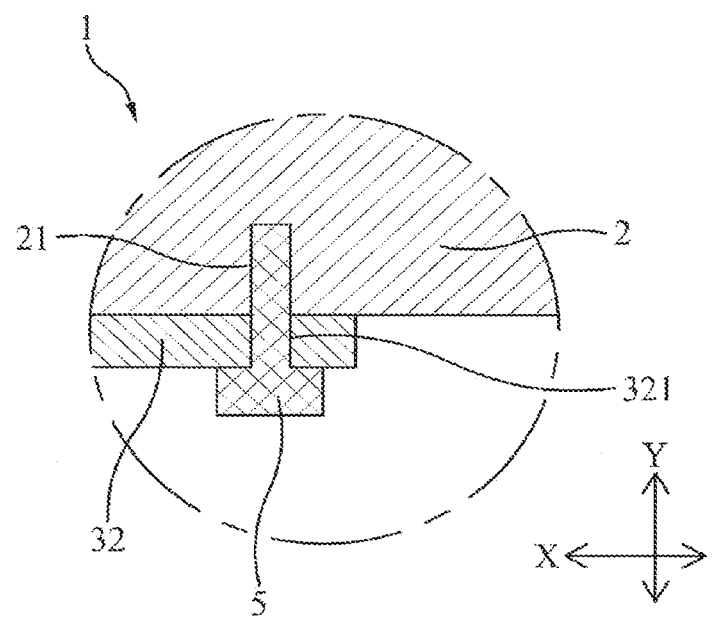
FIG. 5 is an enlarged diagram of a cross section I in FIG. 4.

Second, the frame apparatus 1 for agricultural vehicles according to the second embodiment of the present invention is implemented to reduce a degree of increase in weight exerted on the engine frame 2 in order to achieve a supporting force for supporting the protection unit 300 and the rear working machine 200. When both the protection unit 300 and the rear working machine 200 are mounted on the agricultural vehicle 10, the protection frame 6 and the rear frame 4 connected to the engine frame 2 share the load exerted by the protection unit 300 and the rear working machine 200 in order to support the protection unit 300 and the rear working machine 200. Also, when only the protection unit 300 is mounted on the agricultural vehicle 10, the protection frame 6 connected to the engine frame 2 may share the load exerted by the protection unit 300 in order to support the protection unit 300. In this case, when the rear frame 4 is detached from the engine frame 2, only the protection frame 6 may be connected to the engine frame 2, as shown in FIG. 3.

Accordingly, the frame apparatus 1 for agricultural vehicles according to the second embodiment of the present invention may provide a sufficient supporting force to support the protection unit 300 and the rear working machine 200 using the protection frame 6 and the rear frame 4 by reducing an increase in weight of the engine frame 2 or without increasing the weight of the engine frame 2. Also, when only the protection unit 300 is mounted on the agricultural vehicle 10, the frame apparatus 1 for agricultural vehicles according to the second embodiment of the present invention is implemented to reduce the total weight of the engine frame 2 by detachment of the rear frame 4. Therefore, the frame apparatus 1 for agricultural vehicles according to the second embodiment of the present invention may contribute to improving the fuel economy of the agricultural vehicle 10 by preventing the fuel economy of the agricultural vehicle 10 from being reduced due to an unnecessary increase in the total weight of the engine frame 2.

Hereinafter, the engine frame 2, the protection frame 6, and the rear frame 4 in the frame apparatus 1 for agricultural vehicles according to the second embodiment of the present invention will be described in detail with reference to the accompanying drawings. Configurations of the engine frame 2 and the rear frame 4 which differ in comparison with the aforementioned first embodiment will be described for clarity.

Referring to FIGS. 1, 11 and 12, the engine frame 2 may support the protection unit 300. The engine frame 2 and the protection frame 6 may share a load exerted by the protection unit 300 in order to support the protection unit 300. The protection unit 300 serves to protect the driver's seat 13. The protection unit 300 may have a protective function of protecting a driver when the agricultural vehicle 10 rolls over. In this case, the protection unit 300 may be disposed to protrude upward from the driver who sits in the driver's seat 13. Accordingly, the protection unit 300 is supported on the ground when the agricultural vehicle 10 rolls over, thereby preventing the driver who sits in the driver's seat 13 from colliding with the ground. Therefore, the agricultural vehicle 10 may have a protective function for the driver by implementing a roll over protection structure (ROPS) using the protection unit 300.

Referring to FIGS. 1, 11 to 13, the protection frame 6 serves to support the protection unit 300 mounted on the agricultural vehicle 10. The protection frame 6 may be connected to each of the protection unit 300 and the engine frame 2. Accordingly, the protection frame 6 and the engine frame 2 may share a load exerted by the protection unit 300 in order to support the protection unit 300. Therefore, the frame apparatus 1 for agricultural vehicles according to the second embodiment of the present invention may be implemented to reduce an increase of weight of the engine frame 2 and simultaneously achieve a sufficient supporting force for the protection unit 300. The protection unit 300 may be connected to the protection frame 6 so that the protection unit 300 is arranged at an upper side of the protection frame 6. The protection frame 6 may be connected to each of the engine frame 2 and the protection unit 300 by a fastening means. The protection frame 6 may be connected to be fixed to the engine frame 2. The protection frame 6 may also be detachably connected to the engine frame 2.

The protection frame 6 may include a protective support member 61.

The protective support member 61 is configured to be connected to the protection unit 300. The protective support member 61 may be connected to the protection unit 300 to support the protection unit 300. The protection frame 6 may be connected to the engine frame 2 so that the protective support member 61 is arranged at an upper side of the engine frame 2. The protection unit 300 may be connected to the protective support member 61 so that the protection unit 300 is arranged at an upper side of the protective support member 61. The protective support member 61 may be generally formed in the form of a rectangular plate, but the present invention is not limited thereto. For example, the protective support member 61 may also be formed in the form of plates having other shapes as long as the protective support member 61 can be connected to the protection unit 300 to support the protection unit 300. The protective support member 61 may be connected to the protection unit 300 by a fastening means.

The protection frame 6 may include a protective connection member 62.

The protective connection member 62 is configured to be connected to the engine frame 2. The protective connection member 62 may be connected to the engine frame 2 to support the protection unit 300 together with the engine frame 2. The protective connection member 62 may be generally formed in the form of a rectangular plate, but the present invention is not limited thereto. For example, the protective connection member 62 may also be formed in the form of plates having other shapes as long as the protective connection member 62 can be connected to the engine frame 2 to support the protection unit 300.

The protective connection member 62 may be connected to the engine frame 2 so that the protective connection member 62 is arranged at the outside of the engine frame 2. The outside of the engine frame 2 refers to an outer side of the engine frame 2 with respect to the first axial direction (a Y-axis direction). That is, the outside of the engine frame 2 refers to a lateral side of the agricultural vehicle 10. Accordingly, the frame apparatus 1 for agricultural vehicles according to the second embodiment of the present invention may improve the ease of performing a process of connecting the protective connection member 62 to the engine frame 2. When the protection frame 6 is detachably connected to the engine frame 2, the frame apparatus 1 for agricultural vehicles according to the second embodiment of the present invention may improve the ease of performing a process of detaching the protective connection member 62 from the engine frame 2.

When the protection frame 6 includes the protective support member 61, the protective connection member 62 may be connected to the engine frame 2 at a position at which the protective connection member 62 is spaced downward from the protective support member 61. Also, the protective connection member 62 may extend forward from the protective support member 61 (in a FD arrow direction) so that the protective connection member 62 is connected to the engine frame 2. Accordingly, the frame apparatus 1 for agricultural vehicles according to the second embodiment of the present invention is implemented to disperse a load exerted by the protection unit 300 in a forward direction (a FD arrow direction) of the engine frame 2 through the protective connection member 62. Therefore, the frame apparatus 1 for agricultural vehicles according to the second embodiment of the present invention may contribute to maintaining the balance between the front and rear of the agricultural vehicle 10.

A protective connection hole 621 (shown in FIG. 13) may be formed in the protective connection member 62. The protective connection hole 621 may be formed through the protective connection member 62. In this case, a second fixing hole 22 (shown in FIG. 13) corresponding to the protective connection hole 621 may be formed in the engine frame 2. A second fixing means 7 may be inserted into the protective connection hole 621 and the second fixing hole 22. The second fixing means 7 may be inserted into the protective connection hole 621 and the second fixing hole 22 to fix the protective connection member 62 to the engine frame 2. The second fixing means 7 may be inserted into the protective connection hole 621 and the second fixing hole 22, and fastened therein to fix the protective connection member 62 to the engine frame 2. In this case, screw threads may be formed in the second fixing means 7, an inner surface of the protective connection member 62 in which the protective connection hole 621 is formed, and an inner surface of the engine frame 2 in which the second fixing hole 22 is formed.

The protection frame 6 may include a protective reinforcement member 63.

The protective reinforcement member 63 serves to connect the protective support member 61 and the protective connection member 62. The protective reinforcement member 63 may be connected to each of the protective support member 61 and the protective connection member 62 so that the protective reinforcement member 63 is arranged between the protective support member 61 and the protective connection member 62. The protective reinforcement member 63 is implemented to disperse a load exerted by the protection unit 300 in a forward direction (a FD arrow direction) of the engine frame 2 by transferring the load of the protection unit 300, which has been transferred through the protective support member 61, to the protective connection member 62. Therefore, the frame apparatus 1 for agricultural vehicles according to the second embodiment of the present invention may contribute to maintaining the balance between the front and rear of the agricultural vehicle 10. Also, the protective reinforcement member 63 may enhance the rigidity of the protection frame 6 by increasing the total size of the protection frame 6. Therefore, the frame apparatus 1 for agricultural vehicles according to the second embodiment of the present invention may use the protection frame 6 to more strongly support the load exerted by the protection unit 300.

The protective reinforcement member 63 may be disposed upright in a vertical direction so that the protective reinforcement member 63 may be coupled to each of the protective support member 61 and the protective connection member 62 which are spaced apart in a vertical direction. In this case, the protective reinforcement member 63 may be disposed so that the protective reinforcement member 63 is arranged between the protective support member 61 and the protective connection member 62. The protective support member 61 may be disposed so that the protective support member 61 is arranged at upper sides of the protective reinforcement member 63 and the protective connection member 62. The protective connection member 62 may be disposed so that the protective connection member 62 is arranged at lower sides of the protective reinforcement member 63 and the protective support member 61.

The protective reinforcement member 63 may be generally formed in the form of a rectangular bar, but the present invention is not limited thereto. For example, the protective reinforcement member 63 may also be formed in other shapes such as a rectangular bar shape as long as the protective reinforcement member 63 can be configured to connect the protective support member 61 and the protective connection member 62. The protective reinforcement member 63, the protective support member 61, and the protective connection member 62 may also be formed integrally.

The protective reinforcement member 63 may be disposed so that the protective reinforcement member 63 is arranged at the outside of the engine frame 2. That is, the protective reinforcement member 63 may be disposed so that the protective reinforcement member 63 is arranged at a lateral side of the agricultural vehicle 10. Accordingly, the frame apparatus 1 for agricultural vehicles according to the second embodiment of the present invention may be implemented so that the protective reinforcement member 63 is not interfered with or hindered while a process of connecting the protection frame 6 is performed. Therefore, the frame apparatus 1 for agricultural vehicles according to the second embodiment of the present invention may improve the ease of performing the process of connecting the protection frame 6. When the protection frame 6 is detachably connected to the engine frame 2, the frame apparatus 1 for agricultural vehicles according to the second embodiment of the present invention may be implemented so that the protective reinforcement member 63 is not interfered with or hindered while a process of detaching the protection frame 6 is performed. Therefore, the frame apparatus 1 for agricultural vehicles according to the second embodiment of the present invention may improve the ease of performing the process of detaching the protection frame 6. The protective reinforcement member 63 may be disposed so that the protective reinforcement member 63 is arranged at a position at which the protective reinforcement member 63 is spaced apart from the engine frame 2 in the first axial direction (a Y-axis direction).

Here, the protection frame 6 may include a plurality of protective connection members 62 and a plurality of protective reinforcement members 63.

Each of the protective connection members 62 and 62' (shown in FIG. 12) may be connected to the engine frame 2 so that the protective connection members 62 and 62' are arranged at the outside of the engine frame 2. In this case, the engine frame 2 may be disposed so that the engine frame 2 is arranged between the protective connection members 62 and 62' in the first axial direction (a Y-axis direction). That is, the protective connection members 62 and 62' may be disposed so that the protective connection members 62 and 62' are arranged at both lateral sides of the agricultural vehicle 10, respectively.

Each of the protective reinforcement members 63 and 63' (shown in FIG. 12) may be connected to the engine frame 2 so that the protective reinforcement members 63 and 63' are arranged at the outside of the engine frame 2. In this case, the engine frame 2 may be disposed so that the engine frame 2 is arranged between the protective reinforcement members 63 and 63' in the first axial direction (a Y-axis direction). That is, the protective reinforcement members 63 and 63' may be disposed so that the protective reinforcement members 63 and 63' are arranged at both lateral sides of the agricultural vehicle 10. The protective support member 61 may be coupled to each of the protective reinforcement members 63 and 63'. In this case, the protective support member 61 may be disposed parallel with the first axial direction (a Y-axis direction).

As such, the frame apparatus 1 for agricultural vehicles according to the second embodiment of the present invention may further enhance a supporting force for the load exerted by the protection unit 300 through the protective connection members 62 and 62' and the protective reinforcement members 63 and 63'. Therefore, the frame apparatus 1 for agricultural vehicles according to the second embodiment of the present invention may further enhance durability of the agricultural vehicle 10.

Referring to FIGS. 1, 11 to 15, the rear connection member 42 of the rear frame 4 and the protective connection member 62 of the protection frame 6 may be disposed to overlap each other so that the rear connection member 42 and the protective connection member 62 may be detachably connected to the engine frame 2. Accordingly, regions of the rear connection member 42 and the protective connection member 62 which are connected to the engine frame 2 may be implemented as a support structure consisting of three parts. Therefore, the frame apparatus 1 for agricultural vehicles according to the second embodiment of the present invention may further enhance a supporting force for the load exerted by the protection unit 300 and the rear working machine 200.

The rear connection member 42 may be disposed so that the rear connection member 42 is arranged at the outside of the protective connection member 62. The outside of the protective connection member 62 refers to an outer side of the engine frame 2 with respect to the first axial direction (a Y-axis direction). In this case, the rear support member 41 may be connected to the rear working machine 200 whose detachment frequency with respect to the agricultural vehicle 10 is greater than that of the protection unit 300. The detachment frequency with respect to the agricultural vehicle 10 refers to the number of times of detachment with respect to the agricultural vehicle 10. Therefore, the greater detachment frequency with respect to the agricultural vehicle 10 refers to a greater number of times of detachment with respect to the agricultural vehicle 10 within a predetermined period of time. For example, when there are not many places that require an excavation process depending on a working environment of the agricultural vehicle 10, a backhoe working machine may be detached from the agricultural vehicle 10 while the excavation process is not performed in the places requiring the excavation process. In this case, the rear support member 41 may be connected to the backhoe working machine, and the rear connection member 42 may be disposed so that the rear connection member 42 is arranged at the outside of the protective connection member 62.

Accordingly, the rear connection member 42 is implemented to be detached from the engine frame 2 even in a state in which the protective connection member 62 is not detached from the engine frame 2. That is, the rear frame 4 may be detached from the engine frame 2 in a state in which the protection frame 6 is connected to the engine frame 2. Also, the rear frame 4 may be connected to the engine frame 2 in a state in which the protection frame 6 is connected to the engine frame 2.

Therefore, when the rear working machine 200 whose detachment frequency with respect to the agricultural vehicle 10 is greater than that of the protection unit 300 is mounted and detached, the frame apparatus 1 for agricultural vehicles according to the second embodiment of the present invention is implemented to mount and detach the rear working machine 200 in a state in which the protection unit 300 is mounted on the engine frame 2. Accordingly, the frame apparatus 1 for agricultural vehicles according to the second embodiment of the present invention may improve the ease of performing a process of mounting and detaching the rear working machine 200. Also, the frame apparatus 1 for agricultural vehicles according to the second embodiment of the present invention may shorten the time taken to perform a process of mounting and detaching the rear working machine 200, thereby enhancing an operation rate of the agricultural vehicle 10.

When the rear connection member 42 and the protective connection member 62 are disposed to overlap each other, the rear connection member 42 and the protective connection member 62 may be fixed to the engine frame 2 by the second fixing means 7. The second fixing means 7 may be inserted into the rear connection hole 421, the protective connection hole 621, and the second fixing hole 22 to fix the protective connection member 62 and the rear connection member 42 to the engine frame 2. Accordingly, the frame apparatus 1 for agricultural vehicles according to the second embodiment of the present invention may improve the ease of performing a process of fixing the protective connection member 62 and the rear connection member 42 to the engine frame 2. The second fixing means 7 may be inserted into the rear connection hole 421, the protective connection hole 621, and the second fixing hole 22, and fastened therein to fix the protective connection member 62 and the rear connection member 42 to the engine frame 2. In this case, screw threads may be formed in the second fixing means 7, an inner surface of the rear connection member 42 in which the rear connection hole 421 is formed, an inner surface of the protective connection member 62 in which the protective connection hole 621 is formed, and an inner surface of the engine frame 2 in which the second fixing hole 22 is formed. Although not shown, the protective connection member 62 may also be fixed to the engine frame 2 by the second fixing means 7 and a protective fixing unit (not shown). The protective fixing unit may fix the protective connection member 62 to the engine frame 2 at a position at which the protective fixing unit is spaced apart from the rear connection member 42. Accordingly, the protection frame 6 may be maintained in a state in which the protection frame 6 is fixed to the engine frame 2 by a protective fixing means while the second fixing means 7 is removed to detach the rear frame 4.

The rear reinforcement member 43 of the rear frame 4 may be disposed so that the rear reinforcement member 43 is arranged at the outside of the protective reinforcement member 63 of the protection frame 6. The outside of the protective reinforcement member 63 refers to an outer side of the engine frame 2 with respect to the first axial direction (a Y-axis direction). Accordingly, the frame apparatus 1 for agricultural vehicles according to the second embodiment of the present invention may be implemented so that the protective reinforcement member 63 is not interfered with or hindered while a process of connecting the rear frame 4 or a process of detaching the rear frame 4 is performed. Therefore, the frame apparatus 1 for agricultural vehicles according to the second embodiment of the present invention may enhance the rigidity of each of the rear frame 4 and the protection frame 6 through the rear reinforcement member 43 and the protective reinforcement member 63, and may also improve the ease of performing a process of connecting the rear frame 4 and a process of detaching the rear frame 4.

Figure 15:
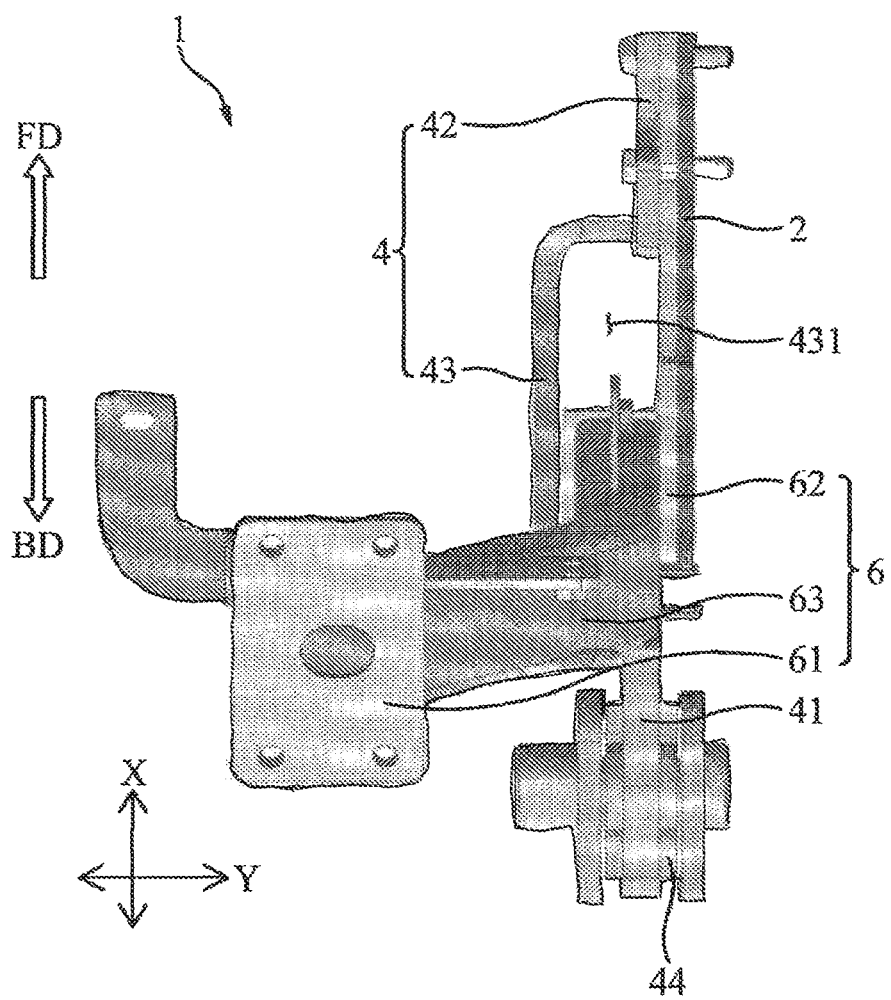
FIG. 15 is a schematic partial top plan view for explaining a connection relationship between the protection frame, the rear frame and the engine frame in the frame apparatus for agricultural vehicles according to the second embodiment of the present invention.

The rear reinforcement member 43 may include an avoidance groove 431 (shown in FIG. 15).

The avoidance groove 431 serves to position the protective reinforcement member 63. The rear frame 4 may be connected to the engine frame 2 so that the rear frame 4 avoids the protective reinforcement member 63 by means of the avoidance groove 431 when the rear frame 4 is connected to the engine frame 2. In this case, the rear reinforcement member 43 may be disposed so that the rear reinforcement member 43 avoids the protective reinforcement member 63 by means of the avoidance groove 431. The protective reinforcement member 63 may be positioned in the avoidance groove 431. The rear reinforcement member 43 may be disposed through the avoidance groove 431 so that the rear reinforcement member 43 is arranged at a position at which the rear reinforcement member 43 is spaced apart from the protective reinforcement member 63 in the first axial direction (a Y-axis direction). The avoidance groove 431 may be implemented by bending the rear reinforcement member 43.

Here, when the frame apparatus 1 for agricultural vehicles according to the second embodiment of the present invention includes the plurality of rear frames 4, the rear frames 4 and 4' may be detachably connected to each of the rear working machine 200 and the engine frame 2 so that each of the rear frames 4 and 4' is arranged at the outside of the engine frame 2. The protection frame 6 may be disposed between the rear frames 4 and 4' in the first axial direction (a Y-axis direction).

The frame apparatus 1 for agricultural vehicles according to the second embodiment of the present invention may include the front frame 3. A configuration of the front frame 3 which differs in comparison with the aforementioned first embodiment will be described for clarity.

Referring to FIG. 16, the front frame 3 may be connected to the engine frame 2 at a position at which the front frame is spaced apart from the protection frame 6. In this case, the front frame 3 and the protection frame 6 may be disposed so that the front frame 3 and the protection frame 6 are spaced apart from each other in the traveling direction (an X-axis direction). Accordingly, the front frame 3 may be connected to the engine frame 2 and may be detached from the engine frame 2 without being interfered with or hindered by the protection frame 6. The rear frame 4 may include a plurality of rear connection holes 421. The rear connection holes 421 and 421' may be formed through the rear connection member 42 at a position at which the rear connection holes 421 and 421' are spaced apart from each other in the traveling direction (an X-axis direction).

The second fixing means 7 may be inserted into the rear connection hole 421 which is arranged at a relatively backward position in the backward direction (BD arrow direction) among the rear connection holes 421 and 421'. The second fixing means 7 may be inserted into the rear connection hole 421, the protective connection hole 621, and the second fixing hole 22 to fix the rear frame 4 and the protection frame 6 to the engine frame 2.

The first fixing means 5 may be inserted into the rear connection hole 421' which is arranged in at a relatively forward position in the forward direction (a FD arrow direction) among the rear connection holes 421 and 421'. The first fixing means 5 may be inserted into the rear connection hole 421', the front connection hole 321, and the first fixing hole 21 to fix the rear frame 4 and the front frame 3 to the engine frame 2.

Here, a frame apparatus 1 for agricultural vehicles according to a modified second embodiment of the present invention may also be implemented to include only the engine frame 2 and the rear frame 4. In this case, the rear frame 4 may be detachably connected to each of the backhoe working machine and the engine frame 2 to support the backhoe working machine. The rear frame 4 may include the rear connection hole 421. Accordingly, when the protection frame 6 configured to support the protection unit 300 is provided, the rear frame 4 may be connected to the engine frame 2 using the rear connection hole 421.

Here, a frame apparatus 1 for agricultural vehicles according to another modified second embodiment of the present invention may also be implemented to include only the engine frame 2 and the protection frame 6. In this case, the protection frame 6 may be connected to each of the protection unit 300 and the engine frame 2 to support the protection unit 300. The protection frame 6 may include the protective connection hole 621. Accordingly, when the rear frame 4 configured to support the backhoe working machine is provided, the protection frame 6 may be connected to the engine frame 2 using the protective connection hole 621.

While the exemplary embodiments of the present invention and their advantages have been described in detail with reference to the accompanying drawings, it will be apparent to those skilled in the art to which the present invention belongs that various changes, substitutions and alterations may be made herein without departing from the scope of the present invention.

What is claimed is:

1. A frame apparatus for agricultural vehicles, comprising:
an engine frame configured to support an engine of an agricultural vehicle;
a front frame connected to each of a front working machine and the engine frame to support the front working machine mounted at the front of the agricultural vehicle; and
a rear frame connected to each of a rear working machine and the engine frame to support the rear working machine mounted at the rear of the agricultural vehicle,
wherein the front frame comprises a front connection member connected to the engine frame,
wherein the rear frame comprises a rear connection member connected to the engine frame, and
wherein the front connection member and the rear connection member are disposed to overlap each other so that the front connection member and the rear connection member are detachably connected to the engine frame.

2. The frame apparatus for agricultural vehicles of claim 1, wherein:
a plurality of front frames are connected to the engine frame, and
the front frames are detachably connected to each of the front working machine and the engine frame so that the front frames are arranged at the outside of the engine frame.

3. The frame apparatus for agricultural vehicles of claim 1, wherein:
a plurality of rear frames are connected to the engine frame, and
the rear frames are detachably connected to each of the rear working machine and the engine frame so that the rear frames are arranged at the outside of the engine frame.

4. The frame apparatus for agricultural vehicles of claim 1, wherein the rear connection member is disposed so that the rear connection member is arranged at the outside of the front connection member.

5. A frame apparatus for agricultural vehicles, comprising:
an engine frame configured to support an engine of an agricultural vehicle; and
a front frame detachably connected to each of a loader working machine and the engine frame to support the loader working machine,
wherein the front frame comprises a front connection hole through which a rear frame configured to support a backhoe working machine is connected.

6. A frame apparatus for agricultural vehicles, comprising:
an engine frame configured to support an engine of an agricultural vehicle;
a protection frame connected to each of a protection unit configured to protect a driver's seat of the agricultural vehicle and the engine frame to support the protection unit; and
a rear frame connected to each of a rear working machine and the engine frame to support the rear working machine mounted at the rear of the agricultural vehicle,
wherein the protection frame comprises a protective connection member connected to the engine frame,
wherein each of the plurality of rear frames comprises a rear connection member connected to the engine frame, and wherein the protective connection member and the rear connection member are disposed to overlap each other so that the protective connection member and the rear connection member are detachably connected to the engine frame.

7. The frame apparatus for agricultural vehicles of claim 6, wherein:
the plurality of rear frames are connected to the engine frame, and
the rear frames are detachably connected to each of the rear working machine and the engine frame so that the rear frames are arranged at the outside of the engine frame.

8. The frame apparatus for agricultural vehicles of claim 6, wherein:
the protection frame is disposed so that the protective connection member is arranged at the outside of the engine frame, and
the rear frames are disposed so that the rear connection member is arranged at the outside of the engine frame.

9. The frame apparatus for agricultural vehicles of claim 6, wherein the rear connection member is disposed so that the rear connection member is arranged at the outside of the protective connection member.

10. The frame apparatus for agricultural vehicles of claim 6, wherein:
the protection frame comprises a protective support member to which the protection unit is connected, and a protective reinforcement member coupled to each of the protective support member and the protective connection member,
each of the rear frames comprises a rear support member connected to the rear working machine, and a rear reinforcement member coupled to each of the rear support member and the rear connection member, and
the rear reinforcement member comprises an avoidance groove at which the protective reinforcement member is arranged so that the rear reinforcement member avoids the protective reinforcement member when the rear reinforcement member is connected to the engine frame.

11. The frame apparatus for agricultural vehicles of claim 6,
further comprising a front frame connected to each of a front working machine and the engine frame to support the front working machine mounted at the front of the agricultural vehicle,
wherein the front frame is detachably connected to the engine frame.

12. The frame apparatus for agricultural vehicles of claim 11, wherein:
a plurality of front frames are connected to the engine frame, and
the front frames are detachably connected to each of the front working machine and the engine frame so that the front frames are arranged at the outside of the engine frame.

13. The frame apparatus for agricultural vehicles of claim 11, wherein:
the front frame comprises a front connection member connected to the engine frame, and
the rear connection member and the front connection member are disposed to overlap each other so that the rear connection member and the front connection member are detachably connected to the engine frame.

14. The frame apparatus for agricultural vehicles of claim 13, wherein:
the rear frame is disposed so that the rear connection member is arranged at the outside of the engine frame,
the front frame is disposed so that the front connection member is arranged at the outside of the engine frame, and
the rear connection member is disposed so that the rear connection member is arranged at the outside of the front connection member.

15. The frame apparatus for agricultural vehicles of claim 6, wherein:
the rear frame comprises a mounting member configured to support the rear working machine, and
the mounting member comprises a mounting groove into which the rear working machine is inserted.

* * * * *